US008425317B2

(12) United States Patent
Izumi

(10) Patent No.: US 8,425,317 B2
(45) Date of Patent: Apr. 23, 2013

(54) GAME DEVICE, METHOD FOR CONTROLLING GAME DEVICE, PROGRAM, AND INFORMATION STORAGE MEDIUM

(75) Inventor: Tadakatsu Izumi, Nara (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/260,484

(22) PCT Filed: Oct. 22, 2009

(86) PCT No.: PCT/JP2009/068208

§ 371 (c)(1), (2), (4) Date: Sep. 26, 2011

(87) PCT Pub. No.: WO2010/109710

PCT Pub. Date: Sep. 30, 2010

(65) Prior Publication Data

US 2012/0021826 A1 Jan. 26, 2012

(30) Foreign Application Priority Data

Mar. 27, 2009 (JP) ................................ 2009-080619

(51) Int. Cl.
*G06F 17/00* (2006.01)

(52) U.S. Cl.
USPC ........................................................... 463/30

(58) Field of Classification Search ............. 463/30–33, 463/37–39
See application file for complete search history.

(56) References Cited

U.S. PATENT DOCUMENTS 7,744,465 B2 * 6/2010 Suzuki et al. .................. 463/32
8,070,607 B2 * 12/2011 Takahashi et al. .............. 463/42
2009/0280898 A1 11/2009 Izumi

FOREIGN PATENT DOCUMENTS

JP 3262677 B2 3/2002
JP 2008-154778 A 7/2008
JP 2008-154779 A 7/2008
JP 2008-228839 A 10/2008

* cited by examiner

*Primary Examiner* — Ronald Laneau
(74) *Attorney, Agent, or Firm* — Sughrue Mion, PLLC

(57) ABSTRACT

To improve, in a game in which a moving object moves in a direction based on a position designated by a game player or a direction based on a direction designated by a game player, operability for a game player in carrying out an operation of designating a position or a direction so that the moving object moves to a predetermined area. A game screen image display control unit (76) shows a view field area in a game space in a game screen image. A game situation update unit (72) moves the ball object in a direction based on a position designated by a game player. A guide image display control unit (74) shows a guide image in a game screen image, the guide image for indicating an area between at least a part of a first line, extending from the position of the ball object to one of the goal posts, and at least a part of a second line extending from the position of the ball object to the other goal post, or an area between at least a part of an extended line of the first line and at least a part of an extended line of the second line.

13 Claims, 18 Drawing Sheets

MAIN MEMORY
26
MICROPROCESSOR
14
IMAGE PROCESSING UNIT
16
DISPLAY DEVICE
18
12
COMMUNICATION I/F
29
SOUND PROCESSING UNIT
20
SOUND OUTPUT DEVICE
22
OPTICAL DISK DRIVE
24
25 : OPTICAL DISK
MEMORY CARD SLOT
27
MEMORY CARD
28
CONTROLLER I/F
30
IMAGE CAPTURING UNIT
34
CAPTURED IMAGE ANALYSIS UNIT
36
32 : CONTROLLER
LIGHT EMISSION UNIT
38
31 : OPERATION INPUT UNIT
11 : CONSUMER GAME DEVICE
10 : GAME DEVICE 60
62
52
54
55
58
57a
51
50
55
56
57b
XW
ZW
YW

C
F
66
B
D
E
A
58
57a
O1(59a)
O2(59b)
O3
52
64
51
50

XW
ZW
YW
L1
L2
L3
e1
e2
A
B
C
D
E
F
67
68
58
O3
O1(59a)
O2(59b)
W1
W3
W4
57a
51
Q
52
50
69(62)

| ID | CONDITION | PARAMETER VALUE | | |
|---|---|---|---|---|
| | | SHOOT ABILITY | ... | ... |
| A-1 | – | 92 | – | – |
| A-2 | – | 74 | – | – |
| ≀ | ≀ | ≀ | ≀ | ≀ |
| A-11 | – | – | – | – |
| B-1 | – | – | – | – |
| B-2 | – | – | – | – |
| ≀ | ≀ | ≀ | ≀ | ≀ |
| B-11 | – | – | – | – |

C
66
B
D
A
58
80
$O_1$(59a)
57a
$O_2$(59b)
52
64
51
50

XW
ZW
YW
L1
L2
L4
C
B
A
D
T
S
Q
67
68
82
57a
58
52
51
50
O1(59a)
O2(59b)
69(62)

| DISTANCE CONDITION | BASE INFORMATION (W4) |
|---|---|
| r < R1 | D1 |
| R1 ≦ r < R2 | D2 |
| R2 ≦ r < R3 | D3 |

D3 < D2 < D1

GAME DEVICE, METHOD FOR CONTROLLING GAME DEVICE, PROGRAM, AND INFORMATION STORAGE MEDIUM

TECHNICAL FIELD

The present invention relates to a game device, a game device control method, a program, and an information storage medium.

BACKGROUND ART

There is known a game in which a moving object moves in a game space, based on an operation by a game player. For example, there is known a sport game in which a score event occurs when a moving object, such as a ball, a puck, or the like, which moves in a game space based on an operation by a game player, has moved into an area inside a goal (Patent Document 1).

In such a game, a ball or a puck moves in a direction in accordance with an operation carried out by a game player. For example, a ball or a puck may move toward the position designated by a game player or in the direction designated by a game player.

PRIOR ART DOCUMENT

Patent Document 1: Japanese Patent Laid-open Publication No. 2008-154779

DISCLOSURE OF THE INVENTION

Problems to be Solved by the Invention

As the above-described game suffers from problems such as those described below, improvement in operability to make it easier for a game player to carry out an operation (an operation of designating a position or a direction) to move a ball or a puck into an area inside a goal is desired.

For example, in displaying a part of the game space in an enlarged size, a goal may not be shown in a game screen image, depending on a situation. With a goal not shown in a game screen image, a game player can hardly recognize the location of the goal. This causes a problem that it is difficult for a game player to designate a position or a direction so that a ball or a puck moves into an area inside the goal.

Even though a goal is shown in a game screen image, there is a problem that it may be difficult for a game player (e.g., a game player at a low training level), when wishing to move a ball or a puck to a desired area (e.g., a corner in a goal) in the goal, to designate a position or a direction so that the ball or puck moves into the area. Further, even when a goal is shown in a game screen image, there is still a problem, when the goal is only shown small, in that it is difficult to designate a position or a direction so that a ball or a puck moves into an area in the goal.

The present invention has been conceived in view of the above, and an object thereof is to provide a game device, a game device control method, a program, and an information storage medium capable of improving, in a game in which a moving object moves in a direction based on a position designated by a game player or a direction based on a direction designated by a game player, operability for a user in carrying out an operation of designating a position or a direction so that the moving object moves into a predetermined area.

Means for Solving the Problems

In order to solve the above described problem, a game device according to the present invention is a game device for carrying out a game in which a moving object moves in a game space, based on an operation by a game player, comprising: a game screen image display control unit for showing at least a partial area of the game space in a game screen image; a movement control unit for moving the moving object in a direction based on a direction designated by the game player or a direction based on a position designated by the game player; and a guide image display control unit for showing a guide image in the game screen image, the guide image for indicating a first area between at least a part of a first line extending from a reference position related to the moving object to a first position related to a predetermined area in the game space and at least a part of a second line extending from the reference position to a second position related to the predetermined area, or a second area between at least a part of a first extended line which is an extended line of the first line and at least a part of a second extended line which is an extended line of the second line.

A game device control method according to the present invention is a control method for controlling a game device for carrying out a game in which a moving object moves in a game space, based on an operation by a game player, comprising: a game screen image display control step of showing at least a partial area of the game space in a game screen image; a movement control step of moving the moving object in a direction based on a direction designated by the game player or a direction based on a position designated by the game player; and a guide image display control step of showing a guide image in the game screen image, the guide image for indicating a first area between at least a part of a first line extending from a reference position related to the moving object to a first position related to a predetermined area in the game space and at least a part of a second line extending from the reference position to a second position related to the predetermined area, or a second area between at least a part of a first extended line which is an extended line of the first line and at least a part of a second extended line which is an extended line of the second line.

A program according to the present invention is a program for causing a computer to function as a game device for carrying out a game in which a moving object moves in a game space, based on an operation by a game player, the program for causing the computer to function as: a game screen image display control unit for showing at least a partial area of the game space in a game screen image; a movement control unit for moving the moving object in a direction based on a direction designated by the game player or a direction based on a position designated by the game player; and a guide image display control unit for showing a guide image in the game screen image, the guide image for indicating a first area between at least a part of a first line extending from a reference position related to the moving object to a first position related to a predetermined area in the game space and at least a part of a second line extending from the reference position to a second position related to the predetermined area, or a second area between at least a part of a first extended line which is an extended line of the first line and at least a part of a second extended line which is an extended line of the second line.

An information storage medium according to the present invention is a computer readable information storage medium storing the above described program.

The present invention relates to a game device for carrying out a game in which a moving object moves in a game space, based on an operation by a game player. According to the present invention, at least a partial area of the game space is shown in a game screen image. The moving object moves in a direction based on a direction designated by a game player or a position designated by a game player. A guide image for indicating a first area between at least a part of a first line extending from a reference position related to the moving object to a first position related to a predetermined area in the game space and at least a part of a second line extending from the reference position to a second position related to the predetermined area, or a second area between at least a part of a first extended line which is an extended line of the first line and at least a part of a second extended line which is an extended line of the second line is shown in the game screen image. According to the present invention, it is possible to improve operability for a user in carrying out an operation of designating a position or a direction so that a moving object moves into a predetermined area.

According to one aspect of the present invention, the game screen image display control unit may show the partial area of the game space in the game screen image, and the guide image display control unit, when the entirety or a part of the predetermined area is not shown in the game screen image, may show the guide image for indicating the first area in the game screen image.

According to one aspect of the present invention, the game may be a game in which a plurality of game characters move in the game space, the moving object may be correlated to any of the plurality of game characters, the reference position may be a position of the moving object or a position of a game character correlated to the moving object, and the guide image display control unit may show the guide image for indicating the first area between a part of the first line and a part of the second line such that at least one of a distance between the part of the first line and the reference position or the first position, and a distance between the part of the second line and the reference position or the second position, is changed, based on a parameter correlated to a game character correlated to the moving objet among parameters stored in a storage unit for storing parameters so as to be correlated to respective game characters.

According to one aspect of the present invention, the game may be a game in which a plurality of game characters move in the game space, the moving object may be correlated to any of the plurality of game characters, the reference position may be a position of the moving object or a position of a game character correlated to the moving object, and the guide image display control unit may show the guide image for indicating the second area between a part of the first extended line and a part of the second extended line such that at least one of a distance between the part of the first extended line and the reference position or the first position, and a distance between the part of the second extended line and the reference position or the second position, is changed, based on a parameter correlated to a game character correlated to the moving object among parameters stored in a storage unit for storing parameters so as to be correlated to respective game characters.

According to one aspect of the present invention, the game may be a game in which a plurality of game characters move in the game space, the moving object may be correlated to any game character of the plurality of game characters, the reference position may be a position of the moving object or a position of a game character correlated to the moving object, and the game device may further comprise a limit unit for limiting display of the guide image, based on relationship between orientation of a game character correlated to the moving object and a direction from the reference position to the predetermined area.

According to one aspect of the present invention, the guide image display control unit may include a unit for showing an image corresponding to a game character or an object which restricts movement of the moving object, so as to be correlated to the guide image in the game screen image, and a unit for controlling a display position of the image corresponding to the game character or the object such that a positional relationship between the image corresponding to the game character or the object and the guide image becomes identical to a positional relationship between the game character or the object and the predetermined area.

According to one aspect of the present invention, the game may be a sport game carried out between a first team corresponding to the game player and a second team, with a score event occurring for the first team when the moving object moves into the predetermined area, the reference position, when the moving object is correlated to any of a plurality of game characters belonging to the first team, may be a position of the moving object or a position of a game character correlated to the moving object, and the movement control unit may include a unit for, when the moving object is correlated to a game character belonging to the first team and a position designated by the game player is included in an area where the guide image is shown, causing the game character correlated to the moving object to carry out a shoot action, and a unit for, when the moving object is correlated to a game character belonging to the first team and a position designated by the game player is included in an area where the guide image is shown, carrying out movement control corresponding to the shoot action with respect to the moving object.

According to one aspect of the present invention, the game space may be a three dimensional space, the movement control unit may further include a unit for controlling an angle formed by a moving direction when the moving object starts moving and a predetermined plane, based on a distance between the reference position and a position designated by the game player, and the guide image display control unit may show the guide image for indicating the second area between a part of the first extended line and a part of the second extended line such that at least one of a distance between the part of the first extended line and the reference position or the first position, and a distance between the part of the second extended line and the reference position or the second position, is changed, based on a distance between the reference position and the predetermined area.

BEST MODE FOR CARRYING OUT THE INVENTION

In the following, an example of an embodiment of the present invention will be described in detail with reference to the accompanying drawings.

1. HARDWARE STRUCTURE OF GAME DEVICE

Figure 1:
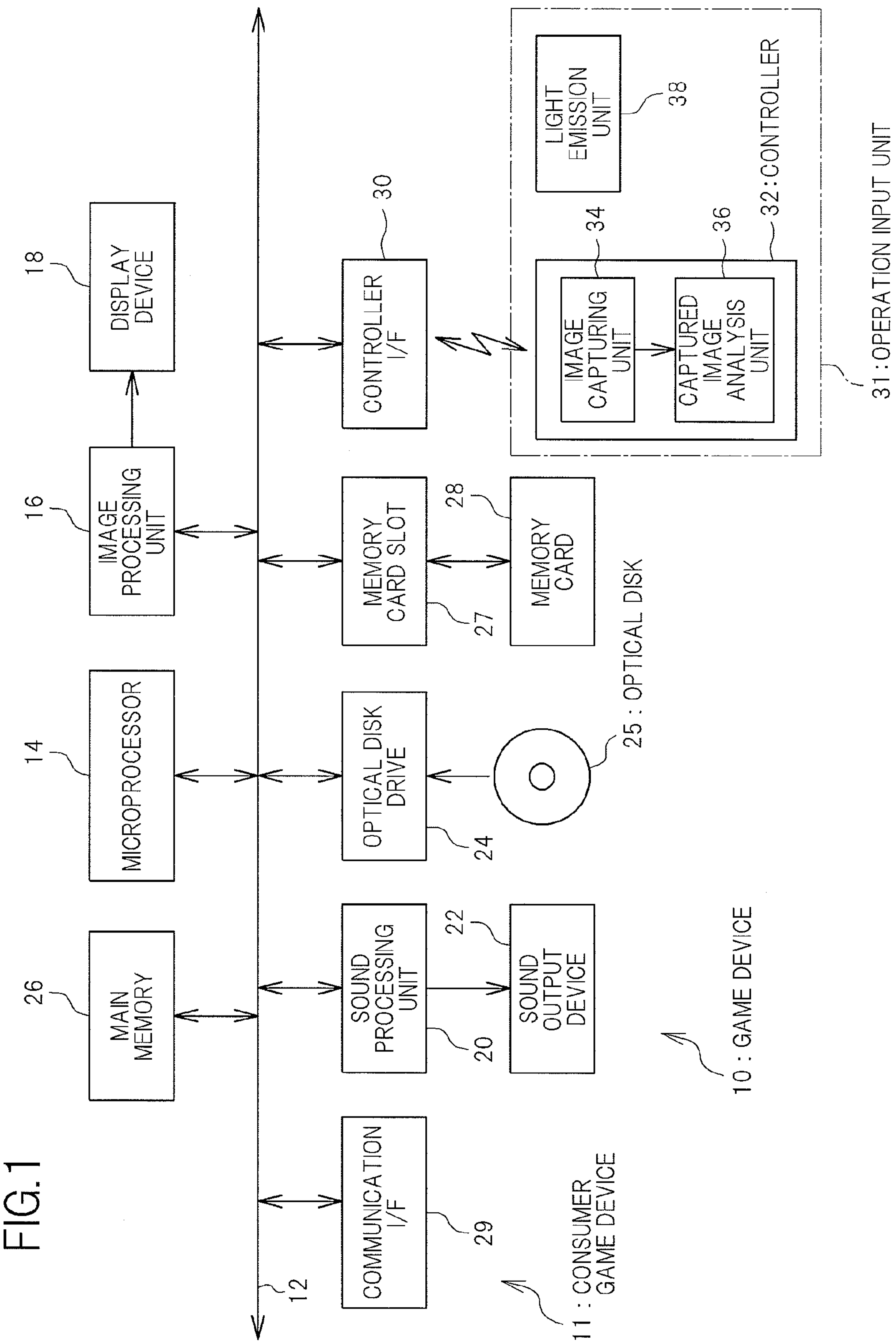
FIG. 1 is a diagram showing one example of a hardware structure of a game device according to an embodiment of the present invention.

FIG. 1 is a diagram showing a structure of a game device according to an embodiment of the present invention. The game device 10 shown in FIG. 1 is formed by mounting an optical disk 25 and a memory card 28, or an information storage medium, in a consumer game device 11, and further by connecting a display device 18 and a sound output device 22. The display device 18 may be, for example, a home-use television set receiver or a liquid crystal display. The sound output device 22 may be, for example, a speaker, a headphone, or an earphone.

The consumer game device 11 is a publicly known computer game system comprising a bus 12, a microprocessor 14, an image processing unit 16, a sound processing unit 20, an optical disk drive 24, a memory card slot 27, a communication interface (I/F) 29, a controller interface (I/F) 30, and an operation input unit 31. Structural elements other than the operation input unit 31 are accommodated in an enclosure.

The bus 12 is used to exchange addresses and data among the respective units of the consumer game device 11. The microprocessor 14, the image processing unit 16, the sound processing unit 20, the optical disk drive 24, the main memory 26, the memory card slot 27, the communication interface 29, and the controller interface 30 are connected to one another so as to exchange data via the bus 12.

The microprocessor 14 controls the respective units of the consumer game device 11, based on an operating system stored in a ROM (not shown) or a program and data read from the optical disk 25 or the memory card 28. The main memory 26 comprises, for example, a RAM, and a program and data read from the optical disk 25 or the memory card 28 is written into the main memory 26 when necessary. The main memory 26 is used also as a working memory of the microprocessor 14.

The image processing unit 16 includes a VRAM and renders a game screen image in the VRAM, based on the image data sent from the microprocessor 14. The image processing unit 16 converts the content into a video signal and outputs to the display device 18 at a predetermined time. The sound processing unit 20 comprises a sound buffer, and reproduces various sound data, such as game music, game sound effects, message, and so forth, read from the optical disk 25 and stored in the sound buffer, and outputs via the sound output device 22.

The optical disk drive 24 reads a program and data recorded on the optical disk 25, such as, for example, CD-ROM, DVD-ROM, and so forth, according to an instruction from the microprocessor 14. Note that although the optical disk 25 is used here to provide a program and data to the consumer game device 11, any other information storage medium, for example, a ROM card, or the like, may be used. Further, a program and data may be supplied from a remote place to the consumer game device 11 via a data communication network, such as the Internet, or the like.

The memory card slot 27 is an interface for mounting a memory card 28. The memory card 28 comprises a nonvolatile memory (e.g., EEPROM or the like). The memory card 28 is used to store various game data, such as, for example, save data or the like. The communication interface 29 is an interface for connecting for communication to a data communication network, such as the Internet, or the like.

The controller interface 30 is an interface for connecting a plurality of controllers 32 by radio. As a controller interface 30, an interface in accordance with, for example, the Bluetooth (registered trademark) interface standard can be used. Note that the controller interface 30 may be an interface for connecting the controller 32 by wire.

Figure 2:
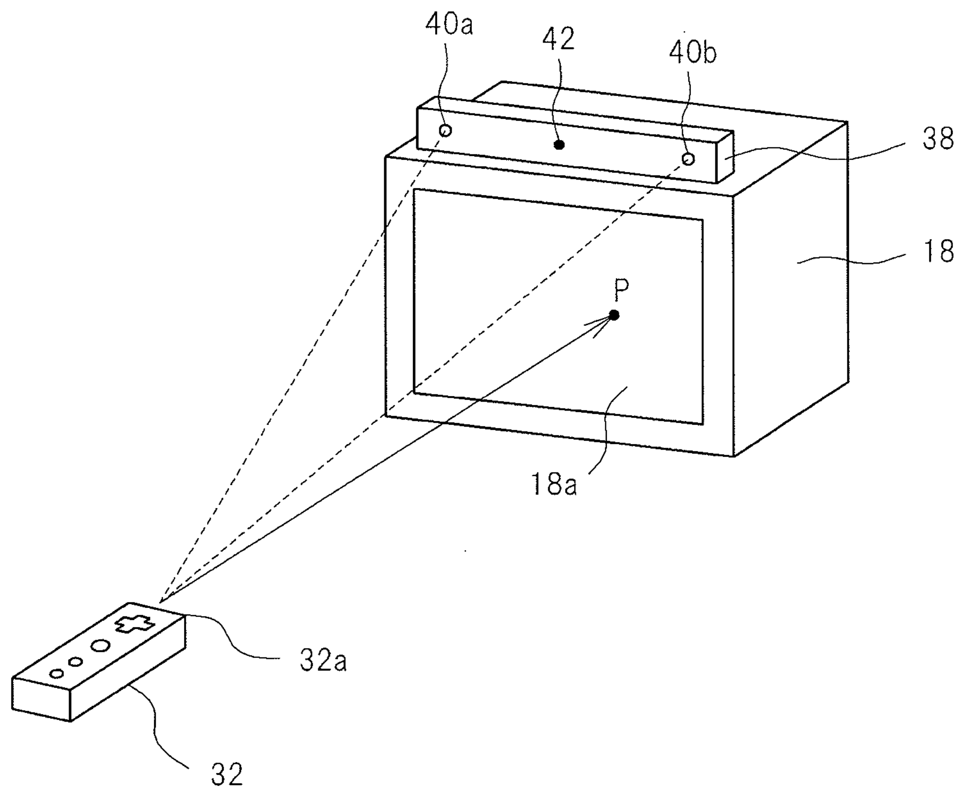
FIG. 2 is a diagram showing one example of an operation input unit.
Figure 3:
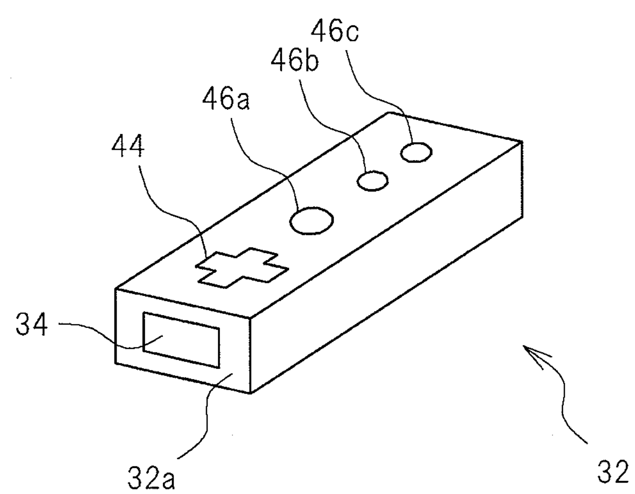
FIG. 3 is a diagram showing one example of a controller.

The operation input unit 31 is used by a game player to input operations. The operation input unit 31 has for example, a function as a pointing device for use by a game player to designate a position in a game screen image displayed on the display device 18. As an operation input unit 31, technique such as is disclosed in, for example, Japanese Patent No. 3262677 can be utilized. The operation input unit 31 comprises the controller 32 and one light emission unit 38. The controller 32 comprises an image capturing unit 34 and a captured image analysis unit 36. FIG. 2 shows one example of the operation input unit 31. FIG. 3 shows one example of the controller 32.

As shown in FIG. 2, the light emission unit 38 is provided on an upper portion of the display device 18. The light emission unit 38 has light sources 40*a*, 40*b* attached to the respective end portions thereof. As shown in FIG. 3, the controller 32 has a direction button 44 and buttons 46*a*, 46*b*, 46*c* formed on the front surface thereof. The direction button 44 has a cross shape and is generally used to designate a direction. The buttons 46*a*, 46*b*, 46*c* are used for various game operations. The controller 32 has an image capturing unit 34, such as, for example, a CCD, or an image capturing element, formed on one lateral surface thereof, and further incorporates a captured image analysis unit 36, such as, for example, a microprocessor. The lateral surface where the image capturing unit 34 is formed is hereinafter referred to as a "front end 32*a* of the controller 32".

When a game player directs the front end 32*a* of the controller 32 toward the display device 18, the light sources 40*a*, 40*b* are shown in a captured image captured by the image capturing unit 34. The captured image analysis unit 36 analyzes the positions of the light sources 40*a*, 40*b* shown in the captured image captured by the image capturing unit 34, and determines the position and inclination of the controller 32, based on the analyzed result. More specifically, the captured image analysis unit 36 calculates a relative position of the controller 32 relative to a predetermined reference position 42 and an inclination angle of the controller 32 relative to the straight line connecting the light source 40*a* and the light source 40*b*. In the game device 10, information concerning a positional relationship between the reference position 42 and a game screen image 18*a* shown on the display device 18 is stored in advance in the game device 10, and the screen coordinate value of the position pointed by the front end 32*a* of the controller 32 is obtained based on the positional relationship information and the position and inclination of the controller 32 obtained by the captured image analysis unit 36. That is, the position P in a game screen image, pointed to by the front end 32*a* of the controller 32 is obtained. The position P refers to a position designated by a game player in a game screen image.

Note that information describing the position and inclination of the controller 32, obtained by the captured image analysis unit 36, that is, information specifying the screen coordinate value of a position designated by the controller 32, is referred to as "pointing information".

The controller 32 sends to the controller interface 30 an operation signal describing the state of the controller 32 being operated every constant period (e.g., every $1/60^{th}$ of a second). The operation signal contains, for example, the above-described pointing information and information describing the state of each button being pressed. The controller interface 30 sends the operation signal received from the controller 32 to the microprocessor 14 via the bus 12, and the microprocessor 14 determines a game operation carried out on the controller 32, based on the operation signal. For example, the microprocessor 14 specifies a position designated by a game player in a game screen image, based on the operation signal (pointing information). Also, the microprocessor 14 determines, based on the operation signal, whether or not the direction button 44 or the buttons 46*a*, 46*b*, 46*c* on each controller 32 have been pressed.

2. GAME PROVIDED IN GAME DEVICE

In the game device 10 having the above described structure, a soccer game to be carried out between a first team corresponding to a game player and a second team opposing the first team is provided. A game player operates a plurality of first player objects (game characters) representing soccer game players belonging to the first team, aiming to produce more score events for the first team than that for the second team. This soccer game is realized by executing a program for a soccer game read from the optical disk 25.

2-1. Game Space

Figure 4:
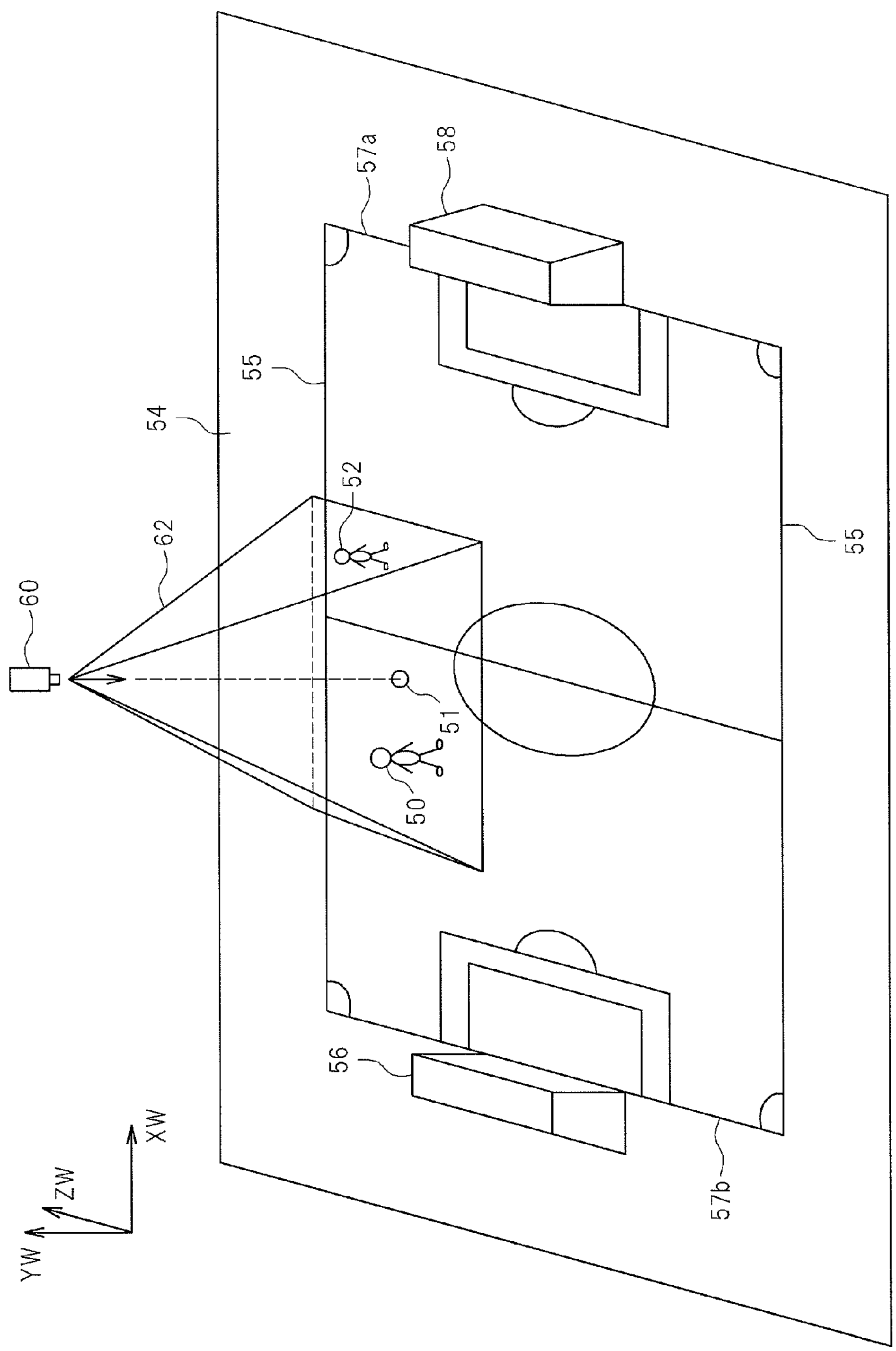
FIG. 4 is a diagram showing one example of a game space.

FIG. 4 is a diagram showing one example of a three dimensional game space created in the main memory 26 in order to provide the above described soccer game. Note that although a case in which the game space is a three dimensional space is described here, the game space may be a two dimensional space.

As shown in FIG. 4, three coordinate axes, namely, an XW axis, a YW axis, and a ZW axis, are defined in the game space. Each of the coordinate axes vertically intersects the other two coordinate axes. A position in the game space is specified by the XW coordinate value, YW coordinate value, and ZW coordinate value (world coordinate value) of the position. A direction parallel to the XW-ZW plane (predetermined plane) is hereinafter referred to as a "horizontal direction", and a direction perpendicular to the XW-ZW plane (direction parallel to the YW coordinate axis) is hereinafter referred to as a "vertical direction".

[2-1-1. Field Object]

A field object 54 representing a soccer field is placed in the game space. The field object 54 is placed on the XW-ZW plane. The field object 54 includes two side lines 55 parallel to the XW axis and goal lines 57*a*, 57*b* parallel to the ZW axis.

[2-1-2. Player Object]

Eleven first player objects 50 (game characters) representing soccer game players belonging to the first team and eleven second player objects 52 representing soccer game players belonging to the second team are placed on the field object 54. In FIG. 4, one first player object 50 and one second player object 52 are shown. A first player object 50 and a second player object 52 will be hereinafter referred to as a "player object" when not being discriminated.

[2-1-3. Ball Object]

A ball object 51 (moving object) representing a soccer ball is also placed on the field object 54.

The ball object 51 moves in the game space. The ball object 51, when getting closer to a player object, is caused to be correlated to the player object. In this embodiment, when the distance in the horizontal direction between the ball object 51 and a player object becomes equal to or shorter than a predetermined distance, the ball object 51 is caused to be correlated to the player object.

Once the ball object 51 is correlated to a player object, the player object is placed in a "state of holding the ball object 51". With the ball object 51 being held by a player object, the ball object 51 will thereafter move following the movement of the player object.

[2-1-4. Goal Object]

Goal objects 56, 58 are also placed on the field object 54.

The goal object 56 is correlated to the first team, and once the ball object 51 has been moved into an area in the goal object 56, a score event occurs to the second team. Meanwhile, the goal object 58 is correlated to the second team, and once the ball object 51 has been moved into an area (predetermined area) in the goal object 58, a score event occurs to the first team.

Figure 5:
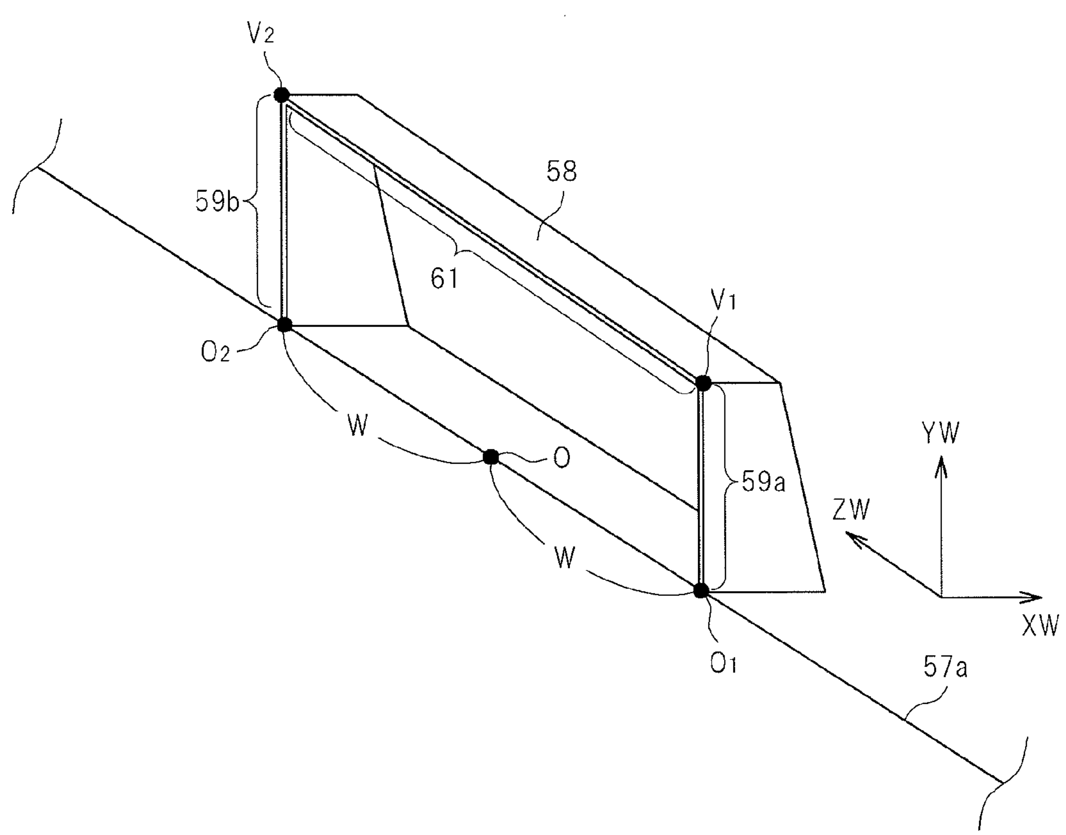
FIG. 5 is a diagram explaining a goal object.

FIG. 5 is a diagram explaining the goal objects 56, 58. In particular, the goal object 58 will be described below. As shown in the diagram, the goal object 58 comprises goal posts 59*a*, 59*b* and a cross-bar 61.

The goal posts 59*a*, 59*b* are located on the goal line 57*a*, standing vertically on the XW-ZW plane. Specifically, the goal posts 59*a*, 59*b* are located equidistance from the central point O of the goal line 57*a*. In FIG. 5, the distance from the central point O to each of the goal posts 59*a*, 59*b* is denoted as W. In the diagram, the first reference position $O_1$ (first position) indicates a position on the XW-ZW plane of the goal post 59*a*, while the second reference position $O_2$ (second position) indicates a position on the XW-ZW plane of the goal post 59*b*. The first reference position $O_1$ and the second reference position $O_2$ correspond to the boundary between the area inside the goal object 58 and the area outside the goal object 58.

The cross-bar 61 connects the vertex $V_1$ of the goal post 59*a* and the vertex $V_2$ of the goal post 59*b*. The ball object 51 cannot move into the area in the goal object 58 unless passing through the area enclosed by the cross-bar 61, the goal line 57*a*, the goal post 59*a*, and the goal post 59*b*. Note that the following description is made based on the assumption that the area in the forward direction of the goal object 58 corresponds to an area having an XW coordinate value smaller than that of the goal line 57*a*, and the area behind the goal object 58 corresponds to an area having an XW coordinate value larger than that of the goal line 57*a*.

[2-1-5. Virtual Camera]

As shown in FIG. 4, a virtual camera 60 is placed above the field object 54. In this embodiment, as shown in FIG. 4, the virtual camera 60 is placed directly above the ball object 51. The virtual camera 60 moves in the horizontal direction, following the movement of the ball object 51.

In this embodiment, the viewing direction of the virtual camera 60 is set in the negative direction of the YW axis (that is, the direction from the virtual camera 60 to the ball object 51). However, the viewing direction of the virtual camera 60 is not necessarily in the negative direction of the YW axis, and may be, for example, "a direction with the angle formed relative to the negative direction of the YW axis being equal to or smaller than a predetermined angle (e.g., 60 degrees)". The viewing direction of the virtual camera 60 may change while a soccer game is being carried on.

A viewing angle is set on the virtual camera 60, so that the microprocessor 14 displays on the display device 18 a game screen image showing a picture obtained by viewing from the virtual camera 60 a view field area 62 defined based on the viewing angle. Note that although the view field area 62 is merely a partial area of the game space in FIG. 4, the position and/or viewing angle of the virtual camera 60 may be set such that the entire game space is included in the view field area 62.

Figure 6:
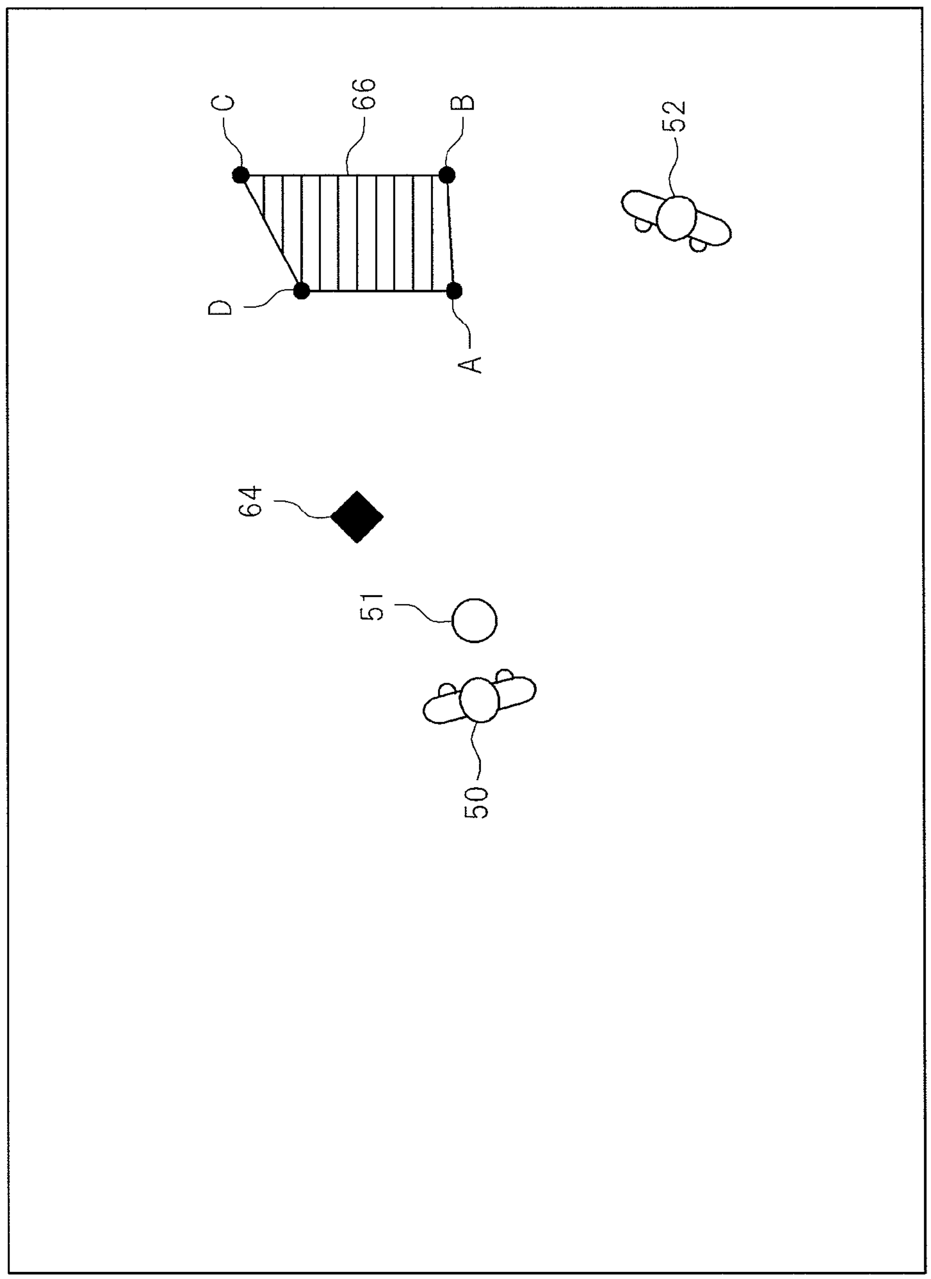
FIG. 6 is a diagram showing one example of a game screen image.

FIG. 6 is a diagram showing one example of a game screen image. Note that FIG. 6 shows one example of a game screen image to be shown with the goal object 58 not shown in the game screen image. In FIG. 6, the ball object 51, one first player object 50 holding the ball object 51, and one second player object 52 are shown in a game screen image. A cursor 64 is also shown in the game screen image. The cursor 64 is shown in a position designated by a game player in the game screen image. A guide image 66 is also shown in the game screen image. The function of the guide image 66 will be described later.

2-2. Action of Player Object

In the above described soccer game, player objects other than the first player object 50 holding the ball object 51 automatically act according to a predetermined algorithm.

Meanwhile, the first player object 50 holding the ball object 51 acts according to an operation signal received by the controller interface 30. A first player object 50 holding the ball object 51 will be hereinafter referred to as an operating object.

For example, a game player designates a direction in which the operating object kicks the ball object 51, by designating a position in a game screen image. When a game player presses a kick instruction button (e.g., the button 46*a*) after designation of a position in a game screen image, the operating object kicks the ball object 51 in a direction based on the display position of the cursor 64, (that is, a position designated by a game player in a game screen image). Specifically, the operating object kicks the ball object 51 toward a position on the XW-ZW plane, corresponding to the display position of the cursor 64. Note that the strength with which the operating object kicks the ball object 51 is determined based on the amount of operation by a game player (e.g., duration of a period of time with the kick instruction button kept pressed, pressure with which the kick instruction button is pressed).

2-3. Guide Image

In the following, a guide image 66 will be described. In this soccer game, a guide image 66 is shown in a game screen image when the ball object 51 is held by a first player object 50. A "position designated by a game player on the XW-ZW plane" refers to a position on the XW-ZW plane, corresponding to the display position of the cursor 64 (position designated by a game player in a game screen image).

The guide image 66 is shown in a game screen image by placing a guide object in a guide area to be described later.

Figure 7:
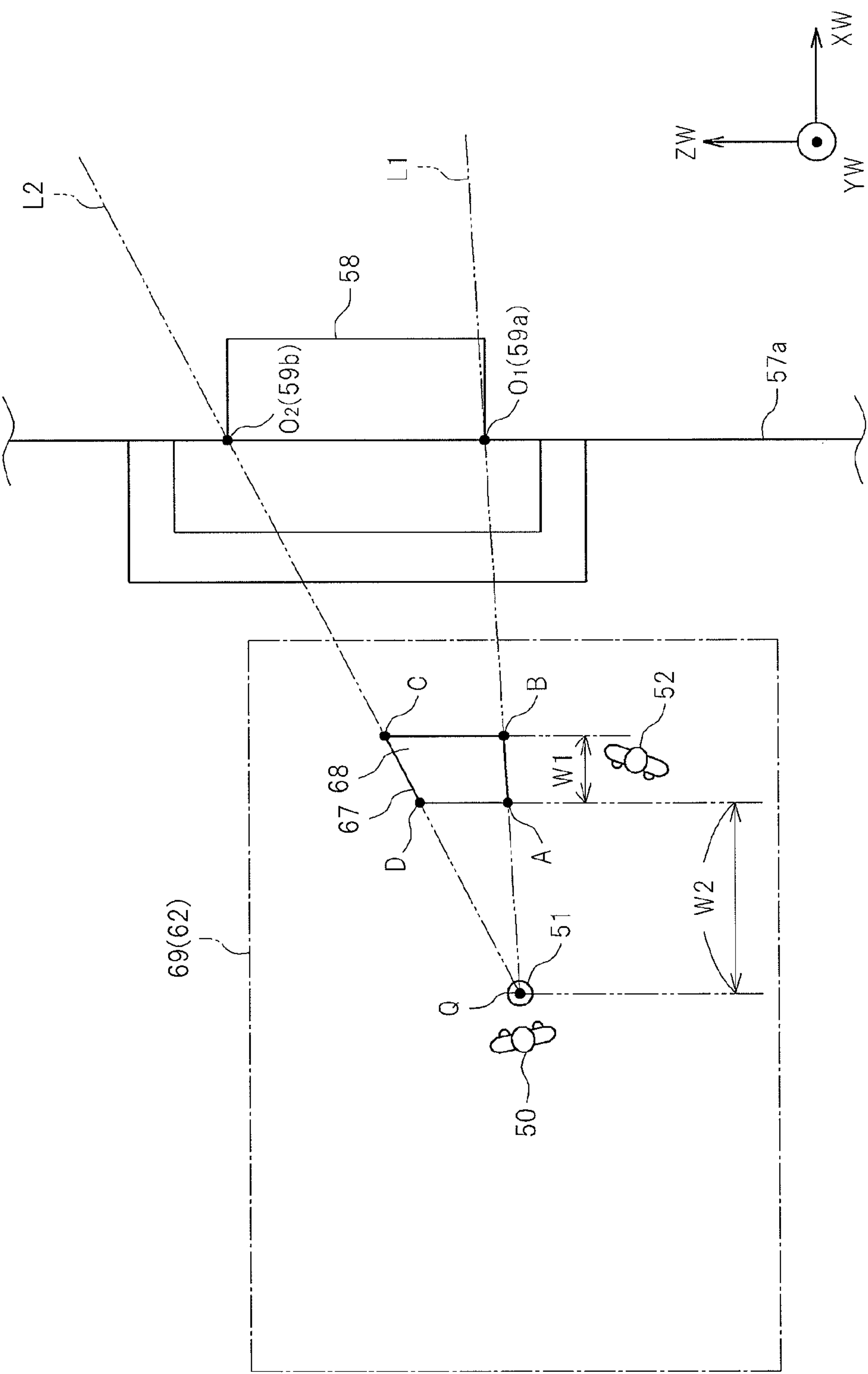
FIG. 7 is a diagram showing one example of a condition of the game space.

FIG. 7 is a diagram explaining a guide area, showing a condition of the game space when the game screen image shown in FIG. 6 is displayed. The vertexes A to D indicate the vertexes of the guide area 67, and the reference position Q indicates the position of the ball object 51 on the XW-ZW plane. The half line L1 is a half line starting from the reference position Q and passing through the first reference position $O_1$, and the half line L2 is a half line starting from the reference position Q and passing through the second reference position $O_2$. The rectangular area 69 enclosed by the alternate long and short dash line represents a view field area 62. W1 refers to the distance in the XW axial direction between the vertexes A and B, and W2 refers to the distance in the XW axial direction between the reference position Q and the vertex A.

The following description is based on the rule that a straight line extending from a point X to a point Y is denoted as a straight line XY.

As shown in FIG. 7, the vertexes A and B of the guide area 67 are defined on the half line L1. In detail, the vertexes A and B are defined on the straight line $QO_1$ extending from the reference position Q to the first reference position $O_1$ such that the guide area 67 is included in the view field area 62. In the example shown, the vertex A of the guide area 67 is set to a point on the straight line $QO_1$ away from the reference position Q by the distance (distance in the XW axial direction) W2. The vertex B of the guide area 67 is set to a point on the straight line $QO_1$ away from the vertex A by the distance (distance in the XW axial direction) W1. Note that the vertex A, B can be any point on the straight line $QO_1$. That is, the vertex A may be set to, for example, the reference position Q, and the vertex B may be set to the first reference position $O_1$. However, the vertexes A and B are not both set to the reference position Q or the first reference position $O_1$.

The vertexes C and D of the guide area 67 are defined on the half line L2. In detail, the vertexes C and D are defined on the straight line $QO_2$ extending from the reference position Q to the second reference position $O_2$ such that the guide area 67 is included in the view field area 62. In the example shown, the vertex D of the guide area 67 is set to a point on the straight line $QO_2$ away from the reference position Q by the distance (distance in the XW axial direction) W2. The vertex C of the guide area 67 is set to a point on the straight line $QO_2$ away from the vertex D by a distance (distance in the XW axial direction) W1. Note that the vertexes C, D can be any point on the straight line $QO_2$. That is, the vertex D may be set to, for example, the reference position Q, and the vertex C may be set to the second reference position $O_2$. However, the vertexes C and D are not both set to the reference position Q or the second reference position $O_2$.

The guide object 68 is placed in the guide area 67 defined as described above, so that the image of the guide object 68 is shown as a guide image 66 in a game screen image.

As the vertexes A and B of the guide area 67 are located on the half line L1 extending from the reference position Q to the first reference position $O_1$ (goal post 59*a*) and the vertexes C and D are located on the half line L2 extending from the reference position Q to the second reference position $O_2$ (goal post 59*b*), the straight line extending from the reference position Q and passing through the guide area 67 resultantly passes between the goal post 59*a* and the goal post 59*b*.

When the ball object 51 is kicked with an appropriate strength in the situation shown in FIG. 7 so as to pass through the guide area 67, the ball object 51 moves into the area in the goal object 58. In the game screen image shown in FIG. 6, a game player can instruct that the ball object 51 passes through the guide area 67, by designating a position inside the area where the guide image 66 is shown and setting an appropriate strength with which to kick the ball object 51.

Therefore, in the game device 10, even when the goal object 58 is not shown in a game screen image, a game player can relatively readily cause the ball object 51 to move toward the area in the goal object 58 by designating a position in the area where the guide image 66 is shown.

In the above, a case in which the goal object 58 is not shown in a game screen image is described. In the following, a case in which the goal object 58 is shown in a game screen image will be described.

Figure 8:
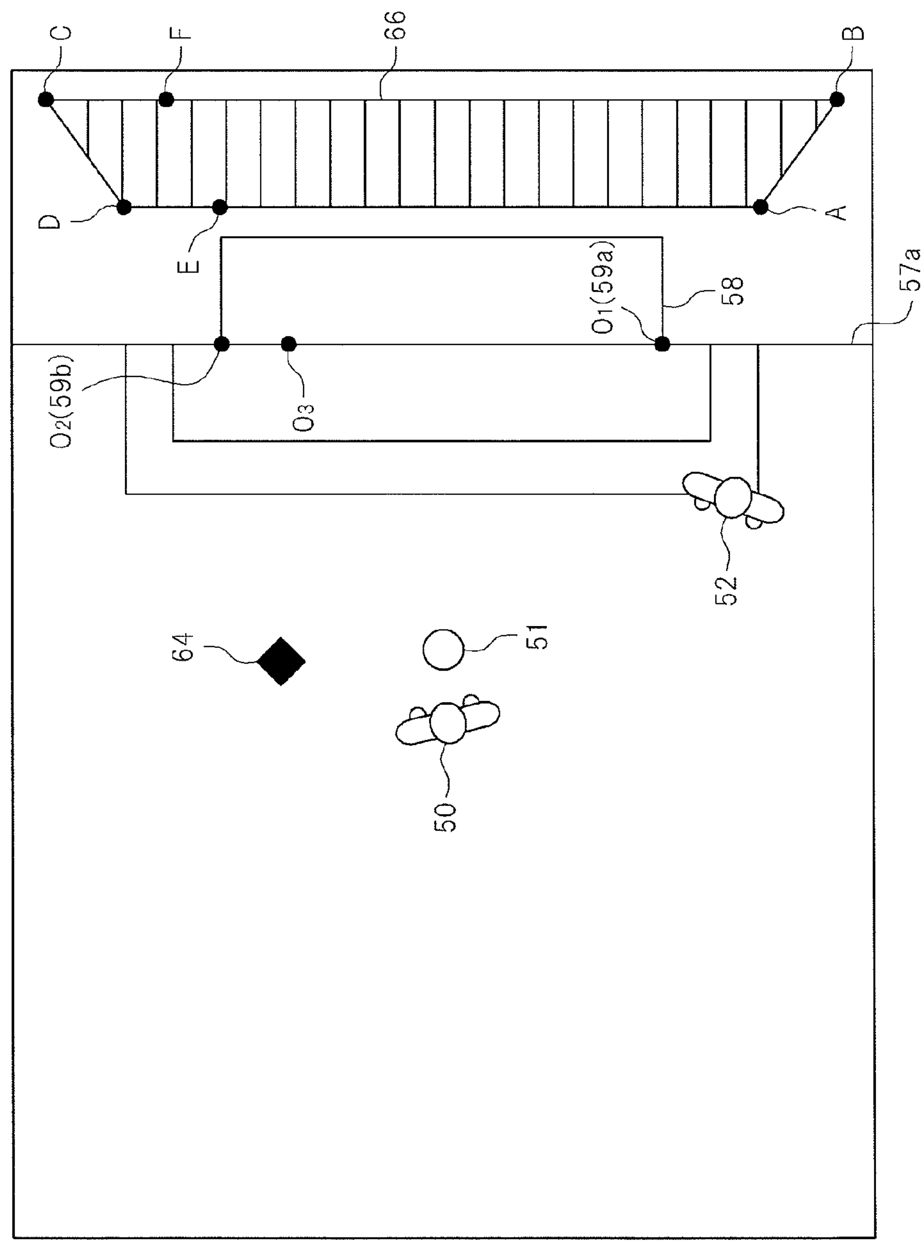
FIG. 8 is a diagram showing one example of a game screen image.

FIG. 8 is a diagram showing one example of a game screen image to be shown with the goal object 58 being shown in a game screen image. As shown in FIG. 8, in this soccer game, the guide image 66 is shown in a game screen image even when the goal object 58 is shown in the game screen image. In this case as well, the guide image 66 is shown in a game screen image by placing the guide object 68 in the guide area 67. In this case, however, the guide area 67 is located behind the goal object 58, and as a result, the guide image 66 is shown behind the image of the goal object 58 in the game screen image.

Figure 9:
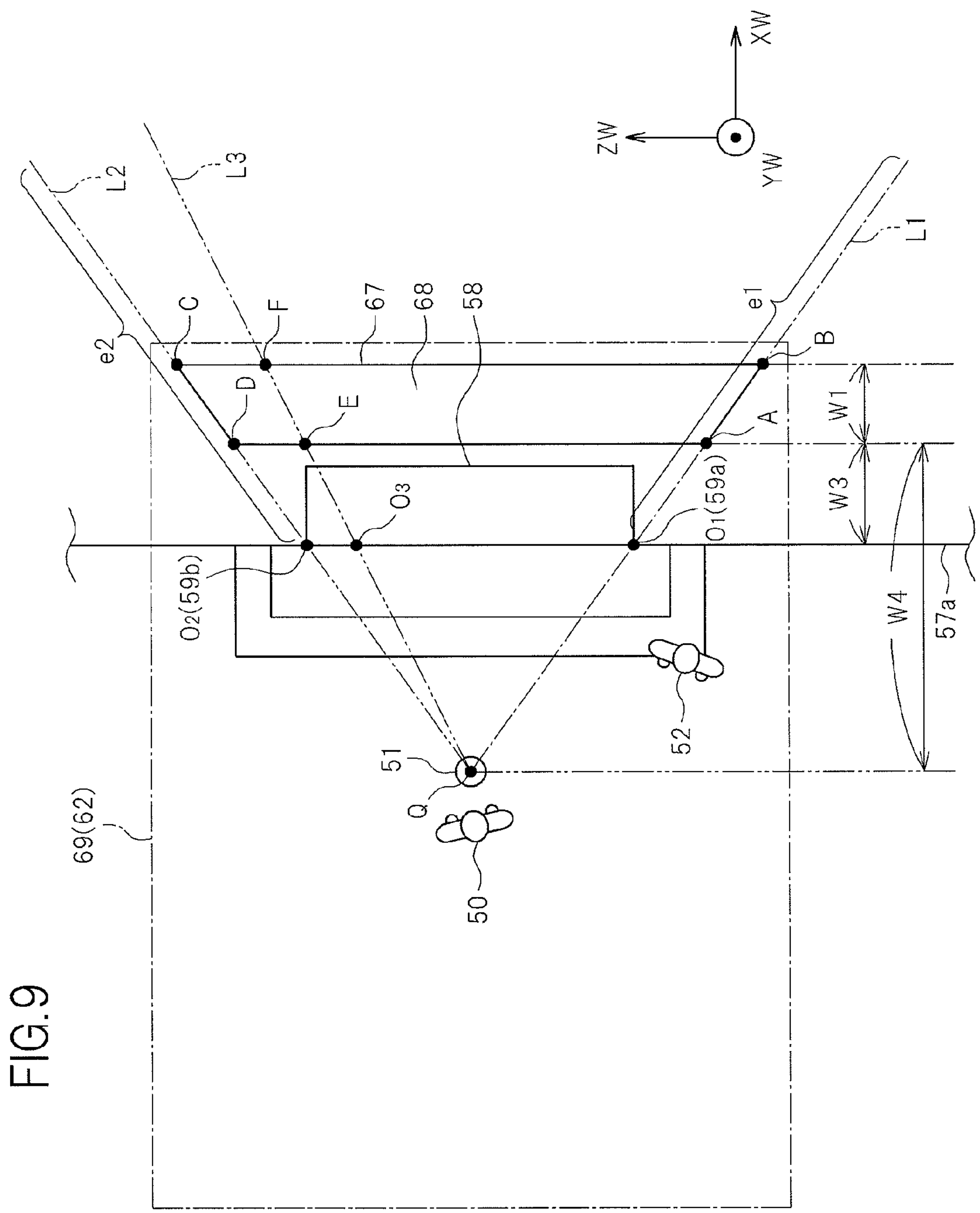
FIG. 9 is a diagram showing one example of a condition of the game space.

FIG. 9 is a diagram explaining the guide area 67 to be shown with the goal object 58 being shown in a game screen image, showing a condition of the game space with the game screen image shown in FIG. 8 being displayed. A first player object 50 holds the ball object 51. The vertexes A to D, the reference position Q, the half line L1, the half line L2, the area 69, and W1 are similar to those in FIG. 7. The first extended line e1 is an extended line of the straight line $QO_2$, and the second extended line e2 is an extended line of the straight line $QO_2$. The half line L3 is a half line extending from the reference position Q and passing through a point $O_3$ near the goal post 59*b*. The point E indicates a cross point where the straight line AD intersects the half line L3, and the point F indicates a cross point where the straight line BC intersects the half line L3. W3 indicates the distance between the first reference position $O_1$ and the vertex A of the guide area 67 in the XW axial direction. W4 indicates the distance between the reference position Q and the vertex A in the XW axial direction.

As shown in the diagram, the vertexes A and B of the guide area 67 are defined on the half line L1. In detail, the vertexes A and B are defined on the first extended line e1 so that the guide area 67 is located behind the goal object 58. In the example shown, the vertex A of the guide area 67 is set to a point on the extended line e1 away from the first reference position $Q_1$ by the distance (distance in the XW axial direction) W3, and the vertex B of the guide area 67 is set to a point on the first extended line e1 away from the vertex A by the distance (distance in the XW axial direction) W1. Note that the vertexes A, B can be any point on the first extended line e1, and the vertex A may be set to the first reference point $O_1$. However, the vertexes A and B are not both set to the first reference position $O_1$.

The vertexes C and D of the guide area 67 are defined on the half line L2. In detail, the vertexes C and D are defined on the second extended line e2 so that the guide area 67 is located behind the goal object 58. In the example shown, the vertex D of the guide area 67 is set to a point on the second extended line e2 away from the second reference position $O_2$ by the distance (distance in the XW axial direction) W3, and the vertex C of the guide area 67 is set to a point on the second extended line e2 away from the vertex D by the distance (distance in the XW axial direction) W1. Note that the vertexes C, D can be any point on the second extended line e2, and the vertex D may be set to the second reference point $O_2$. However, the vertexes C and D are not both set to the second reference position $O_2$.

The guide object 68 is placed in the guide area 67 defined as described above, so that the image of the guide object 68 is shown as a guide image 66 in a game screen image.

That is, also when the goal object 58 is shown in a game screen image, a game player may designate a position in the area where the guide image 66 is shown and set an appropriate strength with which to kick the ball object 51 when wishing to move the ball object 51 to the area in the goal object 58.

Here, when the goal object 58 is shown in a game screen image, a game player can move the ball object 51 toward the area in the goal object 58 by designating a position in the area where the goal object 58 is shown, if not a position in the area where the guide image 66 is shown.

However, when the goal object 58 is only shown small, it is difficult for a game player to designate a position in the area where the goal object 58 is shown.

Regarding this point, as the vertexes A, B of the guide area are defined on the extended line (first extended line e1) of the straight line $QO_1$ and the vertexes C, D of the guide area are defined on an extended line (second extended line e2) of the straight line $QO_2$ so that the guide area 67 is set behind the goal object 58 in this game device 10, the distance between the vertex A and the reference position Q, and the distance between the vertex B and the reference position Q, result in being longer than the distance between the first reference position $Q_1$ and the reference position Q, and the distance between the vertex C and the reference position Q and the distance between the vertex D and the reference position Q result in being longer than the distance between the second reference position $Q_2$ and the reference position Q. Accordingly, the width of the guide area 67 (e.g., the distance between either one of the vertexes A and B and either one of the vertexes C and D) results in being larger than the width (between the goal posts 59*a* and 59*b*) of the goal object 58. Further, the width (e.g., the distance between either one of the vertexes A and B and either one of the vertexes C and D in a game screen image) of the guide image 66 in a game screen image is larger than the width (the distance between the goal posts 59*a* and 59*b* in a game screen image) of the goal object 58 in a game screen image.

As a result, the position in the area where the guide image 66 is shown (e.g., a position between either one of the vertexes A and B and either one of the vertexes C and D in a game screen image) can be more readily designated than a position in the area where the goal object 58 is shown (e.g., a position between the goal post 59*a* and the goal post 59*b* in a game screen image), so that a game player can more readily move the ball object 51 toward the area in the goal object 58.

When wishing to move the ball object 51 into a desired area in the goal object 58, a game player can designate a position in an area corresponding to the desired area in the game screen image to move the ball object 61 to the desired area. For example, when wishing to move the ball object 51 to the area between the goal post 59*b* (second reference position $O_2$) and the point $O_3$ near the goal post 59*b*, a game player can designate a position in an area corresponding to the desired area in a game screen image (e.g., a position between the goal post 59*b* and the point $O_3$ in a game screen image), if not a position in an area corresponding to the square having the vertexes C, D of the guide area 67 and the points E, F as vertexes (e.g., a position between either one of the vertexes E, F and either one of the vertexes C, D in a game screen image) in a game screen image, to move the ball object 51 to the desired area.

However, when a desired area for a game player is small, it may be difficult for the game player to designate a position in an area corresponding to the desired area in a game screen image.

Regarding this point, as the guide area 67 is set behind the goal object 58, as described above, the width of the square CEDF in a game screen image (e.g., the distance between either one of the vertexes E, F and either one of the vertexes C, D in a game screen image) is larger than the width (e.g., the distance between the goal post 59*b* and the point $O_3$ in a game screen image) of the desired area in the game screen image, similar to the width of the guide image 66 in a game screen image resulting in being larger than the width of the goal object 58 in the game screen image. As a result, a position in an area corresponding to the square CEDF in a game screen image (e.g., a position between either one of the vertexes E, F and either one of the vertexes C, D in a game screen image) is more readily designated than a position in an area corresponding to the desired area in a game screen image (e.g., a position between the goal post 59*b* and the point $O_3$ in a game screen image), so that a game player can more readily move the ball object 51 toward the desired area (an area near the goal post 59*b*).

3. FUNCTIONS REALIZED IN GAME DEVICE

Figures 10, 11:
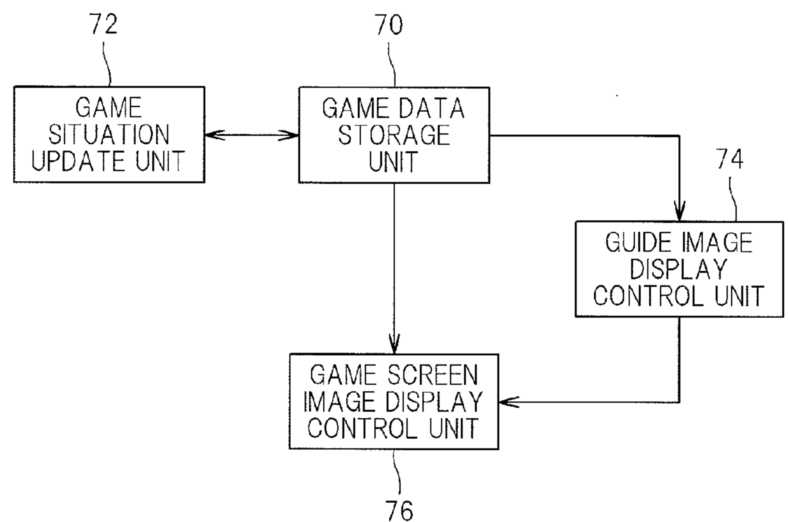
FIG. 10 is a functional block diagram of functions realized in the game device according to this embodiment.
FIG. 11 is a diagram showing content of a part of game situation data.

FIG. 10 is a functional block diagram showing functions realized in the game device 10. As shown in the diagram, a game data storage unit 70, a game situation update unit 72, a guide image display control unit 74, and a game screen image display control unit 76 are realized in the game device 10. These functions are realized by the microprocessor 14 operating according to the program for a soccer game.

3-1. Game Data Storage Unit

The game data storage unit 70 is realized mainly using the main memory 26 or the optical disk 25. The game data storage unit 70 stores various data necessary for providing a soccer game. For example, the game data storage unit 70 stores game situation data including data describing the current condition (position, moving direction, moving speed, player object holding the ball object 51) of the ball object 51, data describing the current position of the virtual camera 60, data concerning each player object, and so forth.

FIG. 11 is a diagram showing content of a part of the game situation data. The game situation data is a table (storage means) correlating, for each player object, data describing the current condition of the player object and parameter values indicating the levels of various abilities of the game player, specifically including an ID field, a condition field, and a parameter field.

In the ID field, the ID of each player object is stored. "A-1" to "A-11" are ID's of the first player objects 50, while "B-1" to "B-11" are ID's of the second player objects 52. In the condition field, data describing the current condition (position, moving direction, moving speed, orientation, action, posture) of each player object is stored. In the parameter field, parameter values indicating the levels of various abilities of each player object are stored. Note that a larger value is stored for higher ability.

3-2. Game Situation Update Unit

The game situation update unit 72 is realized mainly using the microprocessor 14. The game situation update unit 72 updates the game situation data stored in the game data storage unit 70 every constant period. Details of the function of the game situation update unit 72 will be described later (see S101 in FIG. 12).

3-3. Guide Image Display Control Unit

The guide image display control unit 74 (guide image display control means) is realized mainly using the microprocessor 14. The guide image display control unit 74 shows the guide image 66 in a game screen image.

For example, the guide image 66 is an image (see FIG. 6) for indicating a guide area 67 (see FIG. 7) between at least a part of the straight line $QO_1$ (first line) extending from the reference position Q related to the ball object 51 to the first reference position $O_1$ related to an area in the goal object 58, and at least a part of the straight line $QO_2$ (second line) extending from the reference position Q to the second reference position $O_2$ related to an area in the goal object 58.

Alternatively, the guide image 66 may be an image (see FIG. 8) for indicating a guide area 67 (see FIG. 9) between at least a part of an extended line (that is, a first extended line e1) of the straight line $QO_1$ and at least a part of an extended line (that is, a second extended line e2) of the straight line $QO_2$.

Here, the first reference position $O_1$ constitutes a boundary between the area inside the goal object 58 and the area outside the goal object 58, and is also a position corresponding to the goal post 59*a* (e.g., the position of the goal post 59*a* itself). The second reference position $O_2$ constitutes a boundary between the area inside the goal object 58 and the area outside the goal object 58, and also is a position corresponding to the goal post 59*b* (e.g., the position of the goal post 59*b* itself).

In the following, the guide image display control unit 74 will be described. Note that the description below is based on the assumption that the reference position Q is a position on the XW-ZW plane of the ball object 51, but the reference position Q may be a position on the XW-ZW plane of the operating object instead.

In this embodiment, when the entirety or a part of the goal object 58 is not shown in a game screen image (that is, the entirety or a part of the goal object 58 is not included in the view field area 62), the guide image display control unit 74 shows in a game screen image a guide image 66 for indicating the guide area 67 between at least a part of the straight line $QO_1$ and at least a part of the straight line $QO_2$.

Meanwhile, when the entirety or a part of the goal object 58 is shown in a game screen image (that is, the entirety or a part of the goal object 58 is included in the view field area 62), the guide image display control unit 74 shows in a game screen image a guide image 66 for indicating the guide area 67 between at least a part of the first extended line e1 and at least a part of the second extended line e2.

In this embodiment, when a first player object 50 holds the ball object 51, the guide image display control unit 74 shows the guide image 66 in a game screen image. Details of the function of the guide image display control unit 74 will be described later (see S103 and S104 in FIG. 12 and FIG. 13).

3-4. Game Screen Image Display Control Unit

The game screen image display control unit 76 (game screen image display control means) is realized mainly using the microprocessor 14 and the image processing unit 16. The game screen image display control unit 76 shows a view field area 62 which is at least a part of the game space in a game screen image. Details of the function of the game screen image display control unit 76 will be described later (see S104 in FIG. 12).

4. PROCESS TO BE CARRIED OUT IN GAME DEVICE

Figure 12:
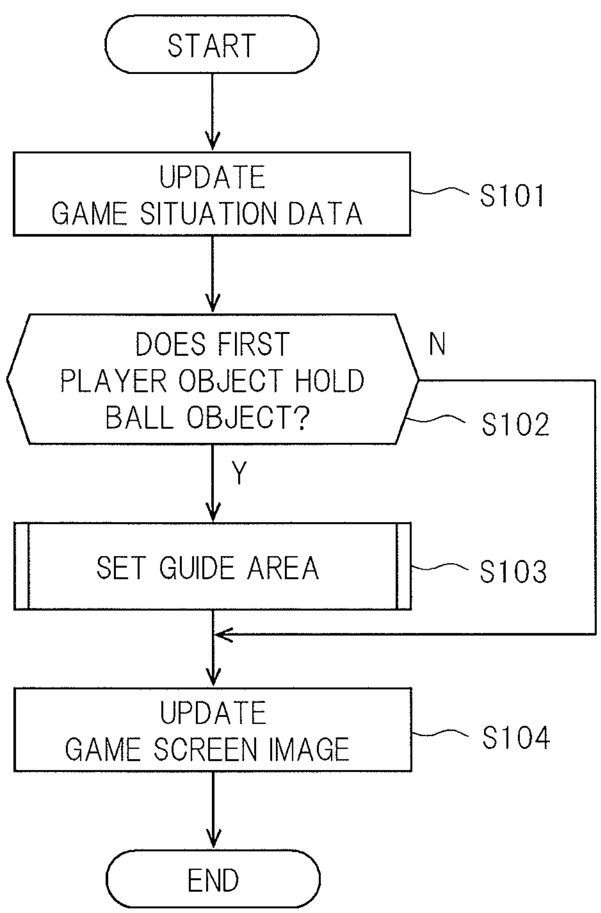
FIG. 12 is a diagram showing one example of a process to be carried out in the game device according to an embodiment of the present invention.

FIG. 12 is a diagram showing one example of a process to be carried out in the game device 10 every constant period. This process is carried out by the microprocessor 14 operating according to the program for a soccer game.

Initially, the microprocessor 14 updates the game situation data (S101). For example, the microprocessor 14 updates the condition of the operating object, based on an operation by a game player, and updates the condition of player objects other than the operating object, based on a predetermined algorithm.

For example, the microprocessor 14 updates the condition of the ball object 51. For example, the microprocessor 14 (movement control means) moves the ball object 51 in a direction based on a position designated by a game player in a game screen image, when a first player object 50 holds the ball object 51 and the kick instruction button is then pressed. In detail, the microprocessor 14 determines an initial moving speed vector indicating the moving direction and moving speed of the ball object 51 when the ball object 51 being kicked by the operating object starts moving, based on a position designated by a game player in a game screen image and the amount of operation by the game player.

For example, the microprocessor 14 determines the initial moving speed vector such that the direction indicated by the horizontal component of the initial moving speed vector becomes identical to the "direction from the reference position Q to a position designated by a game player on the XW-ZW plane". Further, for example, the microprocessor 14 determines the size of the initial moving speed vector, based on the amount of operation by a game player. The size of the initial moving speed vector indicates the moving speed when the ball object 51 starts moving and also the strength with which the operating object kicks the ball object 51. The microprocessor 14 updates the moving direction of the ball object 51 and causes the ball object 51 to start moving in the direction indicated by the initial moving speed vector. When the ball object 51 is moving, the microprocessor 14 carries out a physical operation to update the moving speed and moving direction of the ball object 51.

While referring to the game situation data, the microprocessor 14 determines whether or not a first player object 50 holds the ball object 51 (S102).

When the first player object 50 does not hold the ball object 51 (N at S102), the microprocessor 14 skips 5103 and proceeds to S104. Meanwhile, when the first player object 50 holds the ball object 51 (Y at S102), the microprocessor 14 sets the guide area 67 (S103). In the following, while referring to FIG. 13, a process to be carried out by the game device 10 at S103 will be described.

Initially, the microprocessor 14 determines whether or not the goal object 58 correlated to the second team is included in the view field area 62, that is, whether or not the image of the goal object 58 is shown in a game screen image (S201). At S201, it may be determined that the goal object 58 is included in the view field area 62 when the entire goal object 58 is included in the view field area 62 or when apart of the goal object 58 is included in the view field area 62.

When the goal object 58 is not included in the view field area (N at S201), the microprocessor 14 sets the guide area 67 at S202 to S204.

That is, at S202 the microprocessor 14 obtains the straight line $QO_1$ (first line) extending from the reference position Q to the first reference position $O_1$ (see FIG. 7). It is determined here that a position of the ball object 51 on the XW-ZW plane is defined as the reference position Q.

The microprocessor 14 sets the vertex A, or the first vertex of the guide area 67, on the straight line $QO_1$ (S203). That is, the microprocessor 14 sets the vertex A between the reference position Q and the first reference position $O_1$. In detail, the microprocessor 14 sets the vertex A to a point on the straight line $QO_1$ away from the reference position Q by a distance (distance in the XW axial direction) equal to the predetermined distance W2.

Thereafter, the microprocessor 14 sets the vertex B, or the second vertex of the guide area 67, the vertex C, or the third vertex of the guide area 67, and the vertex D, or the fourth vertex of the guide area 67 (S204).

Specifically, the microprocessor 14 sets the vertex B on the straight line $QO_1$. That is, the microprocessor 14 sets the vertex B between the reference position Q and the first reference position $O_1$. In detail, the microprocessor 14 sets the vertex B to a point on the straight line $QO_1$ away from the vertex A by a distance (distance in the XW axial direction) equal to the predetermined distance W1.

In setting the vertexes C and D, the microprocessor 14 initially obtains the straight line $QO_2$ (second line) extending from the reference position Q to the second reference position $O_2$, and then sets the vertexes C and D on the straight line $QO_2$ (see FIG. 7). That is, the microprocessor 14 sets the vertexes C and D between the reference position Q and the second reference position $O_2$. In detail, the microprocessor 14 sets the vertex D to a cross point where the straight line passing through the vertex A and extending parallel to the straight line $O_1O_2$ intersects the straight line $QO_2$, and sets the vertex C to a cross point where the straight line passing through the vertex B and extending parallel to the straight line $O_1O_2$ intersects the straight line $QO_2$. Note that in this case, the straight line AD and the straight line BC extend parallel to the straight line $O_1O_2$. Therefore, the distance (distance in the XW axial direction) between the reference position Q and the vertex D is resultantly W2, and the distance (distance in the XW axial direction) between the vertexes C and D is resultantly W1.

The microprocessor 14 sets as the guide area 67 a quadrangular area having the vertexes A to D set as described above.

Meanwhile, when the goal object 58 is included in the view field area 62 (Y at S201), the microprocessor 14 sets the guide area 67 at S205 to S207.

That is, the microprocessor 14 obtains an extended line (that is, the first extended line e1) of the straight line $QO_1$ at S205 (see FIG. 9).

Then, the microprocessor 14 sets the vertex A, or the first vertex of the guide area 67, on the first extended line e1

(S206). For example, the microprocessor 14 sets the vertex A to a point on the first extended line e1 away from the first reference position $O_1$ by a distance (distance in the XW axial direction) equal to the predetermined distance W3.

Further, the microprocessor 14 sets the vertex B, or the second vertex of the guide area 67, the vertex C, or the third vertex of the guide area 67, and the vertex D, or the fourth vertex of the guide area 67 (S207).

Specifically, the microprocessor 14 sets the vertex B on the first extended line e1. For example, the microprocessor 14 set the vertex B to a point on the first extended line e1 away from the vertex A by a distance (distance in the XW axial direction) equal to the predetermined distance W1.

In setting the vertexes C and D, the microprocessor 14 initially obtains an extended line of the straight line $QO_2$ (that is, the second extended line e2), and sets the vertexes C and D on the second extended line e2. For example, the microprocessor 14 sets the vertex D to a cross point where the straight line passing through the vertex A and extending parallel to the straight line $O_1O_2$ intersects the second extended line e2, and sets the vertex C to a cross point where the straight line passing through the vertex B and extending parallel to the straight line $O_1O_2$ intersects the second extended line e2. Note that in this case as well, the straight line AD and the straight line BC extend parallel to the straight line $O_1O_2$. Therefore, the distance (distance in the XW axial direction) between the first reference position $O_1$ and the vertex D is resultantly W3, and the distance (distance in the XW axial direction) between the vertexes C and D is resultantly W1.

The microprocessor 14 sets as the guide area 67 a quadrangular area having the vertexes A to D set as described above.

Note that although the microprocessor 14 obtains the straight line $QO_2$ (second line) and the second extended line e2 at S204 and 5207 in order to set the vertexes C and D of the guide area 67, it is not always necessary to obtain the straight line $QO_2$ and the second extended line e2. For example, as shown in FIGS. 7 and 9, the triangle $QO_1O_2$ having as vertexes the reference position Q, the first reference position $O_1$, and the second reference position $O_2$ is analogous with the triangle QAD having as vertexes the reference position Q, the vertex A, and the vertex D. Therefore, the microprocessor 14 can set the vertex D, utilizing the fact that the ratio between the "distance between the reference position Q and the vertex A" and the "distance between the reference position Q and the first reference position $O_1$" is equal to the ratio between the "distance between the vertex A and the vertex D" and the "distance between the first reference position $O_1$ and the second reference position $O_2$ (that is, 2*W)". Similarly, the triangle $QO_1O_2$ is analogous with the triangle QBC having as vertexes the reference position Q, the vertex B, and the vertex C. Therefore, the microprocessor 14 can set the vertex C, utilizing the fact that the ratio between the "distance between the reference position Q and the vertex B" and the "distance between the reference position Q and the first reference position $O_1$" is equal to that between the "distance between the vertex B and the vertex C" and the "distance between the first reference position $O_1$ and the second reference position $O_2$ (that is, 2*W)".

When the guide area 67 is set at S103 or it is determined at S102 that a first player object 50 does not hold the ball object 51, the microprocessor 14 updates the game screen image at S104. Specifically, the microprocessor 14 produces a game screen image showing a picture obtained by viewing the view field area 62 from the virtual camera 60, based on the game situation data. In detail, the microprocessor 14 carries out coordinate conversion through geometry processing from the world coordinate system to the screen coordinate system, and thereafter produces a game screen image through rendering processing.

In the case where the guide area 67 is set at S103, the microprocessor 14 places the guide object 68 in the guide area 67 before producing a game screen image. In this case, the resultant game screen image includes the guide image 66.

A game screen image produced as described above is rendered in the VRAM, and the game screen image rendered in the VRAM is output to the display device 18.

6. CONCLUSION

In the above described game device 10, with the guide image 66 being displayed, a game player can readily designate a position in a game screen image so that the ball object 51 moves toward the goal object 58 or a desired area (e.g., a corner of the goal object 58). As a result, according to the game device 10, operability for a game player in designating a position in a game screen image so that the ball object 51 moves into an area in the goal object 58 can be improved.

7. MODIFIED EXAMPLE

Note that the present invention is not limited to the above-described embodiment. In the following, other aspects (first to sixth modified examples) of the present invention will be described.

7-1. First Modified Example

For example, when a kick instruction button is pressed with the ball object 51 held by a first player object 50 and a position designated by a game player in a game screen image is included in the area where the guide image 66 is displayed, the microprocessor 14 may cause the operating object to carry out a shoot action. After the above, movement control corresponding to the shoot action may be carried out on the ball object 51 having been kicked by the operating object.

Figure 14:
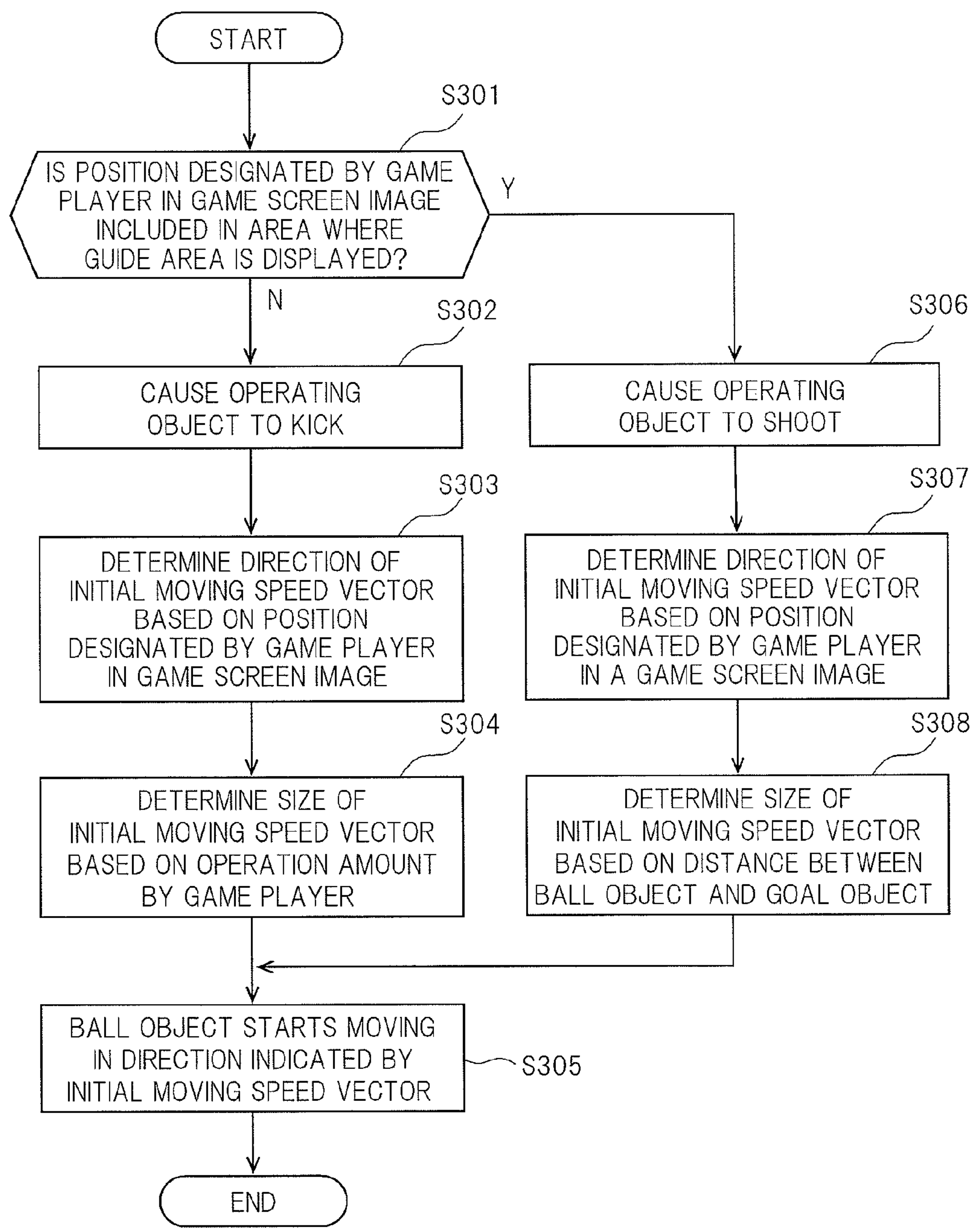
FIG. 14 is a diagram showing one example of a process to be carried out in the game device according to an embodiment of the present invention.

That is, in the first modified example, when a kick instruction button is pressed with a first player object 50 holding the ball object 51 (that is, when the guide area 67 is set), the microprocessor 14 carries out the process shown in FIG. 14 at S101.

That is, the microprocessor 14 determines whether or not a position designated by a game player on the XW-ZW plane is included in the guide area 67 to thereby determine whether or not a position designated by the game player in a game screen image is included in the area where the guide image 66 is displayed (S301).

Then, when the position designated by a game player in a game screen image is not included in the area where the guide image 66 is displayed (N at S301), the microprocessor 14 causes the operating object to carry out a normal kick action (S302). Note that a normal kick action refers to a kick action other than a shoot action to be described later, and may be, for example, a pass action.

The microprocessor 14 carries out movement control corresponding to the kick action relative to the ball object 51 (S303 to S304). That is, at S303 to S304, the microprocessor 14 determines the initial moving speed vector of the ball object 51 kicked by the operating object, based on the position designated by a game player in a game screen image and the amount of operation by the game player.

At S303, the microprocessor 14 determines the direction of the initial moving speed vector, based on the position designated by a game player in a game screen image. In detail, the direction of the initial moving speed vector is determined such that the direction indicated by the horizontal component of the initial moving speed vector coincides with the "direction from the reference position Q to the position designated by a game player on the XW-ZW plane".

Thereafter, at S304, the microprocessor 14 determines, based on the amount of operation by a game player, the size of the initial moving speed vector (the moving speed when the ball object 51 starts moving, and the strength with which the ball object 51 is kicked). For example, the microprocessor 14 carries out a predetermined operation to determine the size of the initial moving speed vector such that a larger amount of operation by a game player results in a larger initial moving speed vector. As a result of the process at S303 and 5304, the initial moving speed vector is determined.

Meanwhile, when the position designated by a game player in a game screen image is included in the area where the guide image 66 is displayed (Y at S301), the microprocessor 14 causes the operating object to carry out a shoot action rather than a normal kick action (S306).

Then, the microprocessor 14 carries out movement control corresponding to the shoot action relative to the ball object 51 (S307 and S308). That is, the microprocessor 14 determines the initial moving speed vector of the ball object 51 at S307 and 5308, based on the position designated by a game player in a game screen image and the distance between the ball object 51 and the goal object 58.

At S307, the microprocessor 14 determines the direction of the initial moving speed vector, similarly to S303.

At S308, the microprocessor 14 determines the size of the initial moving speed vector (the moving speed when the ball object 51 starts moving, and the strength with which the ball object 51 is kicked), based on the distance between the ball object 51 and the goal object 58, rather than the amount of operation by a game player, different from S304. For example, the microprocessor 14 may read a table correlating a distance condition concerning the distance between the reference position Q and the first reference position $O_1$ (distance in the XW axial direction) and the size of the initial moving speed vector from the optical disk 25, and determine the size of the initial moving speed vector, based on the content recorded in the table.

In this case, the table is defined such that a longer distance between the ball object 51 and the goal object 58 results in a larger initial moving speed vector. That is, the table is defined such that the ball object 51 is kicked with strength strong enough for the ball object 51 to reach the goal object 58.

With the initial moving speed vector determined, the microprocessor 14 causes the ball object 51 to start moving in the direction indicated by the initial moving speed vector (S305).

According to the first modified example, the ball object 51 reaches the goal object 58 when a game player merely designates a position in the area where the guide image 66 is displayed, irrespective of the amount of operation by the game player. Therefore, even a game player at a low training level can readily move the ball object 51 into the area in the goal object 58.

7-2. Second Modified Example

For example, the microprocessor 14 (limit means) may limit display of the guide image 66, based on the relationship between the orientation of the operating object and the direction from the reference position Q to the area in the goal object 58.

That is, in the second modified example, when a first player object 50 holds the ball object 51 (Y at S102 in FIG. 12), the microprocessor 14 determines whether or not the orientation of the first player object 50 holding the ball object 51 (that is, an operating object) holds a predetermined relationship with the direction from the reference position Q toward the point O in the goal object 58. Note that "a case in which the orientation of the operating object holds a predetermined relationship with the direction from the reference position Q to the point O" refers to, e.g., "a case in which the cosine of the angle between a vector indicating the orientation of the operating object and a vector indicating the direction from the reference position Q to the point O takes a value equal to or larger than a predetermined value (e.g., 0.8)".

When the orientation of the operating object holds a predetermined relationship with the direction from the reference position Q to the point O, the microprocessor 14 proceeds to S103. In this case, the guide image 66 is shown in a game screen image. Meanwhile, when the orientation of the operating object does not hold a predetermined relationship with the direction from the reference position Q to the point O, the microprocessor 14 skips the process at S103, and proceeds to S104. In this case, no guide image 66 is shown in a game screen image.

In the second modified example, when the operating object is not facing the goal object 58, that is, when the operating object is not ready to kick the ball object 51 toward the goal object 58 and therefore the guide image 66 need not be displayed, display of the guide image 66 is limited. In the second modified example, only when the operating object is facing the goal object 58, that is, when the operating object is ready to kick the ball object 51 toward the goal object 58 and the guide image 66 needs to be displayed, is the guide image 66 displayed. As a result, according to the second modified example, a processing load in displaying the guide image 66 can be reduced.

7-3. Third Modified Example

For example, the microprocessor 14 (guide image display control means) may change the width (distance between at least either one of the vertexes A and B and at least either one of the vertexes C and D in a game screen image) of the guide image 66 in a game screen image, based on a parameter value (e.g., a parameter value of shoot ability) of the operating object. For example, when the goal object 58 is not shown in a game screen image, the microprocessor 14 (guide image display control means) may display the guide image 66 such that the distance between the straight line AB, which is a part of the straight line $QO_1$, and the reference position Q and the distance between the straight line CD, which is a part of the straight line $QO_2$, and the reference position Q will change based on a parameter value (e.g., a parameter value of shoot ability) of the operating object.

When the goal object 58 is shown in a game screen image, the microprocessor 14 (guide image display control means) may display the guide image 66 such that the distance between the straight line AB, which is a part of the first extended line e1, and the first reference position $O_1$ and the distance between the straight line CD, which is a part of the second extended line e2, and the second reference position $O_2$ will change based on a parameter value (e.g., a parameter value of shoot ability) of the operating object.

That is, in the third modified example, a table correlating a condition concerning a parameter value, a value of the distance W2 shown in FIG. 7, and a value of the distance W3 shown in FIG. 9 is stored in advance in the optical disk 25. For example, the above-described table is defined such that a larger parameter value results in larger values of the distance W2 and the distance W3.

With the above, when the goal object 58 is not shown in a game screen image (N at S201 in FIG. 13), the microprocessor 14 carries out the process below at S203. That is, the microprocessor 14 reads a parameter value of shoot ability of the operating object, and also reads from the table the value of the distance W2 correlated to a parameter condition satisfied by the parameter value. Further, the microprocessor 14 sets the vertex A, or the first vertex of the guide area 67, on the straight line $QO_1$, based on the value of the distance W2 read from the table. In this case, the distance between the vertex A, which is the representative point of the straight line AB, and the reference position Q is controlled based on the parameter value of the operating object such that the distance between the straight line AB and the reference position Q will change based on the parameter value of the operating object. In addition, the distance between the vertex D, which is the representative point of the straight line CD, and the reference position Q is controlled based on the parameter value of the operating object such that the distance between the straight line CD and the reference position Q will change based on the parameter value of the operating object. Note that the representative point of the straight line AB may be any point on the straight line AB other than the vertex A, and the representative point of the straight line CD may be any point on the straight line CD other than the vertex D.

Meanwhile, when the goal object 58 is shown in a game screen image (Y at S201 in FIG. 13), the microprocessor 14 carries out the process below at S206. That is, the microprocessor 14 reads a parameter value of shoot ability of the operating object, and also reads from the table the value of the distance W3 correlated to a parameter condition satisfied by the parameter value. Further, the microprocessor 14 sets the vertex A, or the first vertex of the guide area 67, on the first extended line e1, based on the value of the distance W3 read from the table. In this case, the distance between the vertex A, which is the representative point of the straight line AB, and the first reference position $O_1$ is controlled based on the parameter value of the operating object such that the distance between the straight line AB and the first reference position $O_1$ will change based on the parameter value of the operating object. Further, the distance between the vertex D, which is the representative point of the straight line CD, and the second reference position $O_2$ is controlled based on the parameter value of the operating object such that the distance between the straight line CD and the second reference position $O_2$ will change based on the parameter value of the operating object. Note that even when the goal object 58 is shown in a game screen image, the representative point of the straight line AB may be any point on the straight line AB other than the vertex A, and the representative point of the straight line CD may be any point on the straight line CD other than the vertex D.

In the third modified example, because the guide area 67 is set as described above, a larger shoot ability of the operating object results in a longer distance W2 in the XW axial direction between the vertex A and the reference position Q shown in FIG. 7 and a longer distance W3 in the XW axial direction between the vertex A and the first reference position $O_1$ shown in FIG. 9.

Here, longer distances W2 and W3 result in a longer distance between the reference position Q and the vertex A and a longer distance between the reference position Q and the vertex D, respectively, and also in a longer distance between the reference position Q and the vertex B, C, located away from the vertex A, D, respectively, by the distance W1 in the XW axial direction. Therefore, as described above, the width (distance between at least either one of the vertexes A and B and at least either one of the vertexes C and D) of the guide area 67 and the width (distance between at least either one of the vertexes A and B and at least either one of the vertexes C and D in a game screen image) of the guide image 66 in a game screen image become larger. This makes it easier for a game player to designate a position in the area where the guide image 66 is displayed (position between at least either one of the vertexes A and B and at least either one of the vertexes C and D in a game screen image).

Therefore, the higher the shoot ability of the operating object is, the more easily a game player can designate a position in the area where the guide image 66 is displayed. As a result, the higher the ability of the operating object is, the easier it is for a game player to move the ball object 51 into the area in the goal object 58.

Alternatively, it may be arranged, when the goal object 58 is not shown in a game screen image, such that either one of the distance between the straight line AB and the reference position Q and the distance between the straight line CD and the reference position Q will change based on a parameter value of the operating object so that higher shoot ability of the operating object results in a larger width of the guide image 66 in a game screen image. Still alternatively, it may be arranged such that either one of the distance between the straight line AB and the first reference position $O_1$ and the distance between the straight line CD and the second reference position $O_2$ will change based on a parameter value of the operating object. Note that the distance between the straight line AB and the first reference position $O_1$ refers to the distance between the representative point of the straight line AB and the first reference position $O_1$, and the distance between the straight line CD and the second reference position $O_2$ refers to the distance between the representative point of the straight line CD and the second reference position $O_2$.

Meanwhile, it may be arranged, when the goal object 58 is shown in a game screen image, such that either one of the distance between the straight line AB and the first reference position $O_1$ and the distance between the straight line CD and the second reference position $O_2$ will change based on a parameter value of the operating object so that higher shoot ability of the operating object results in a larger width of the guide image 66 in a game screen image. Alternatively, it may be arranged such that at least one of the distance between the straight line AB and the reference position Q and the distance between the straight line CD and the reference position Q will change based on a parameter value of the operating object. Note that the distance between the straight line AB and the reference position Q refers to the distance between the representative point of the straight line AB and the reference position Q, and the distance between the straight line CD and the second reference position Q refers to the distance between the representative point of the straight line CD and the reference position Q.

7-4. Fourth Modified Example

For example, the microprocessor 14 (guide image display control means) may display a second guide image corresponding to a game character or an object (second player object 52, here) for restricting movement of the ball object 51, so as to be correlated to the guide image 66 in a game screen image. In the fourth modified example, with the second guide image being displayed so as to be correlated to the guide image 66 in a game screen image, a game player is assisted in designating a position in a game screen image so that the ball object 51 moves toward the goal object 58 without being blocked by a second player object 52.

Figure 15:
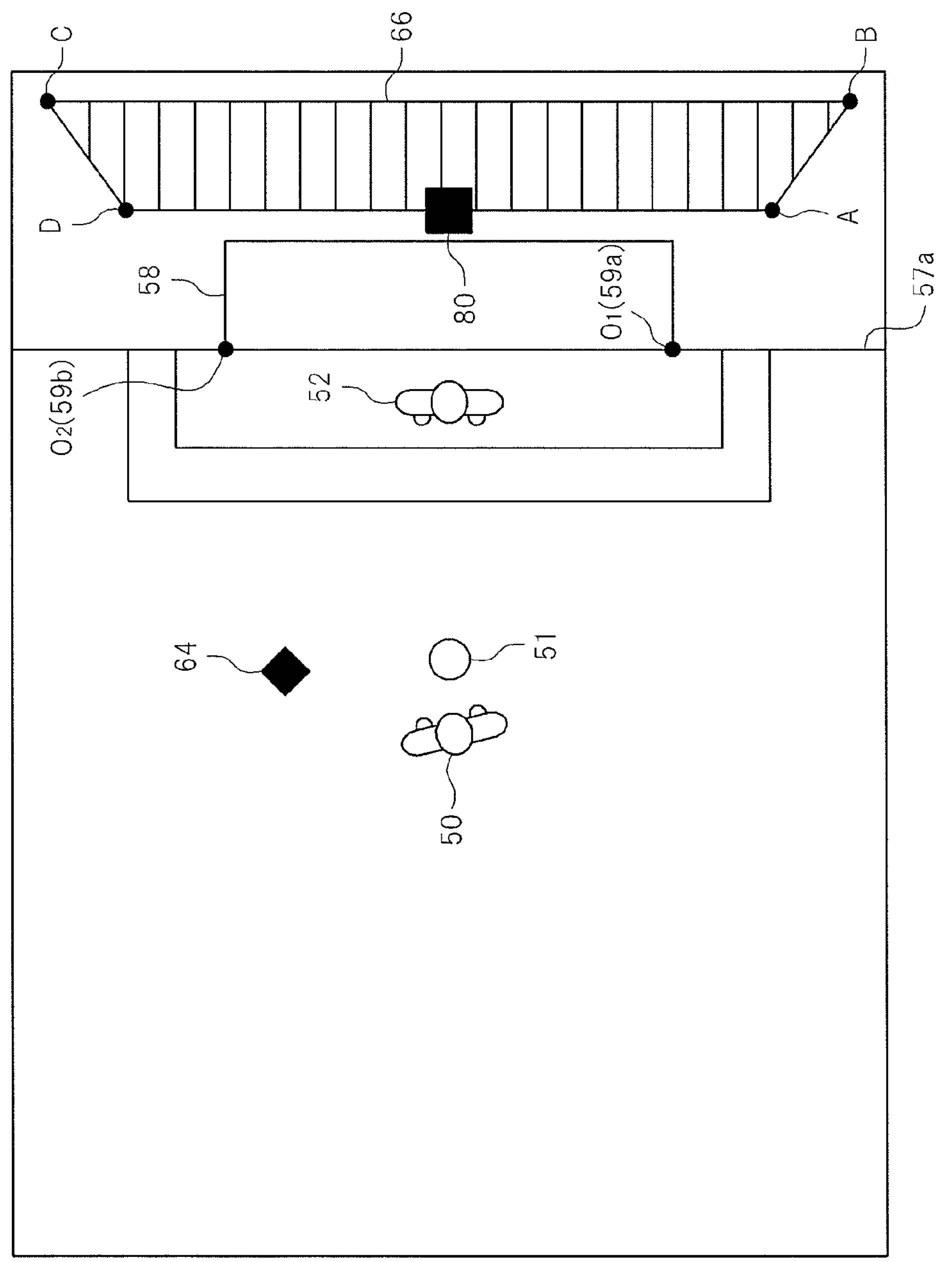
FIG. 15 is one example of a game screen image.

FIG. 15 shows one example of a game screen image in the fourth modified example. A game screen image with the guide image 66 shown behind the image of the goal object 58 is shown here. In the game screen image shown in FIG. 15, a second guide image 80 corresponding to a goal keeper second player object 52 is shown on the edge line of the guide image 66.

In the fourth modified example, the display position of the second guide image 80 is controlled such that the positional relationship between the second guide image 80 and the guide image 66 becomes identical to that between the second player object 52 and the goal object 58. The display position of the second guide image 80 indicates a positional relationship between the second player object 52 and the goal object 58. With the above, a game player can designate, with the assistance of the second guide image 80, a position in a game screen image so that the ball object 51 does not move toward the second player object 52.

Figure 16:
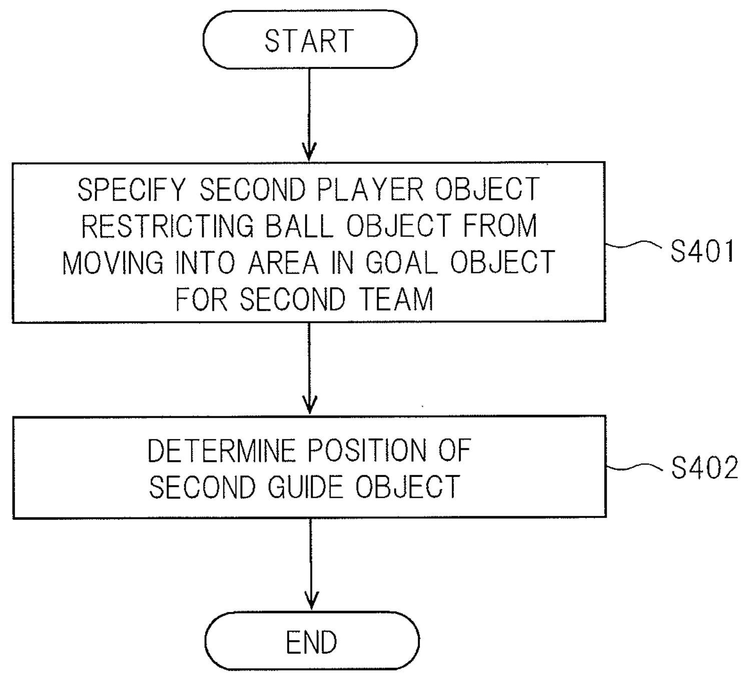
FIG. 16 is a diagram showing one example of a process to be carried out in the game device according to an embodiment of the present invention.
Figure 17:
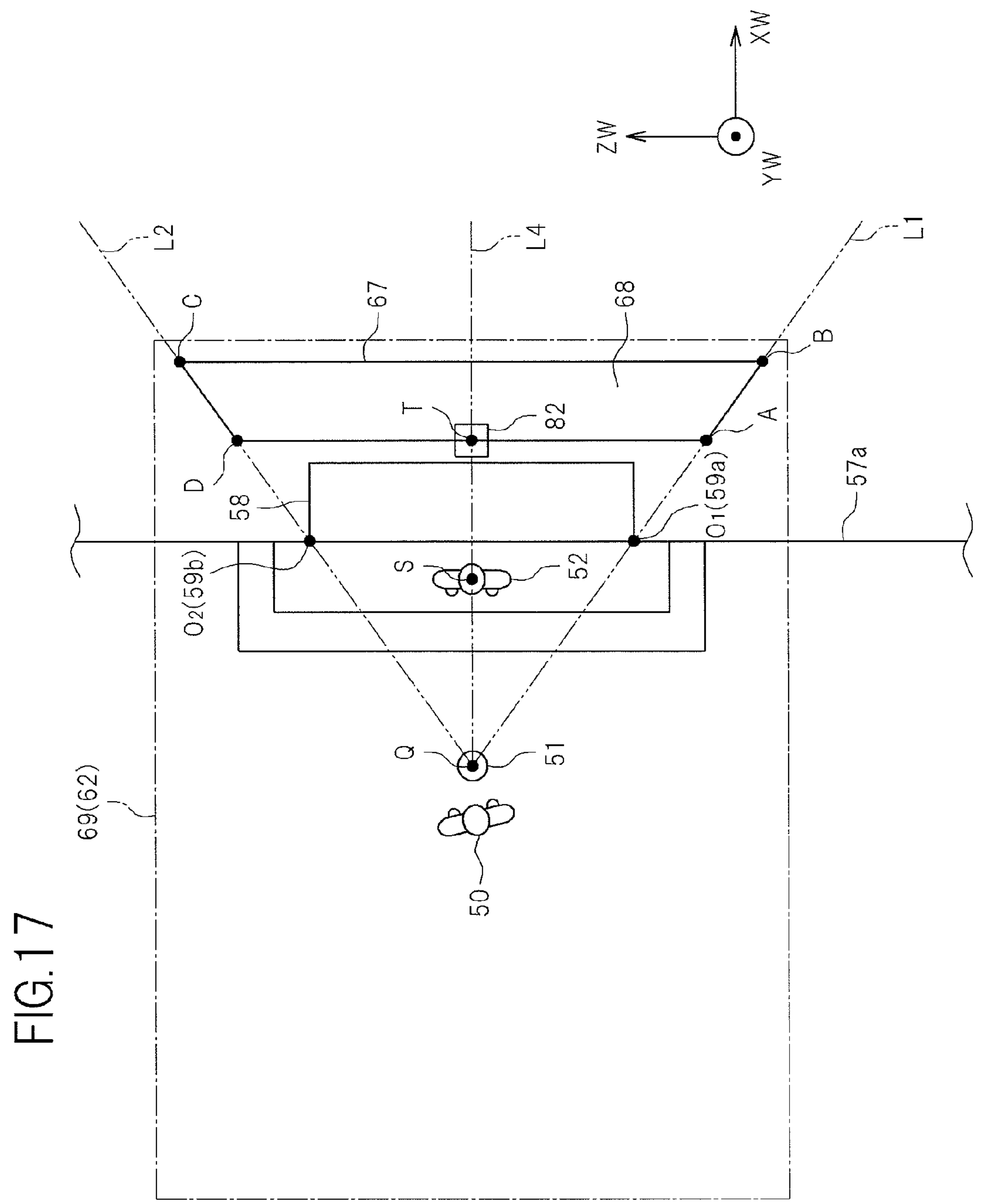
FIG. 17 is a diagram showing one example of a condition of the game space.

FIG. 16 is a flowchart of one example of a process to be carried out in the fourth modified example. FIG. 17 is a diagram showing a condition of the game space with the game screen image shown in FIG. 15 being displayed. In FIG. 17, a first player object 50 holds the ball object 51. The position S refers to the position of a second player object 52, and the half line L4 refers to a half line starting from the reference position Q and passing through the position S. The position T refers to a position where a second guide object 82 corresponding to the second player object 52 is placed. The second guide image 80 is shown in a game screen image by placing the second guide object 82 in the game space. In the following, the fourth modified example will be described in detail with reference to FIGS. 16 and 17.

Figure 13:
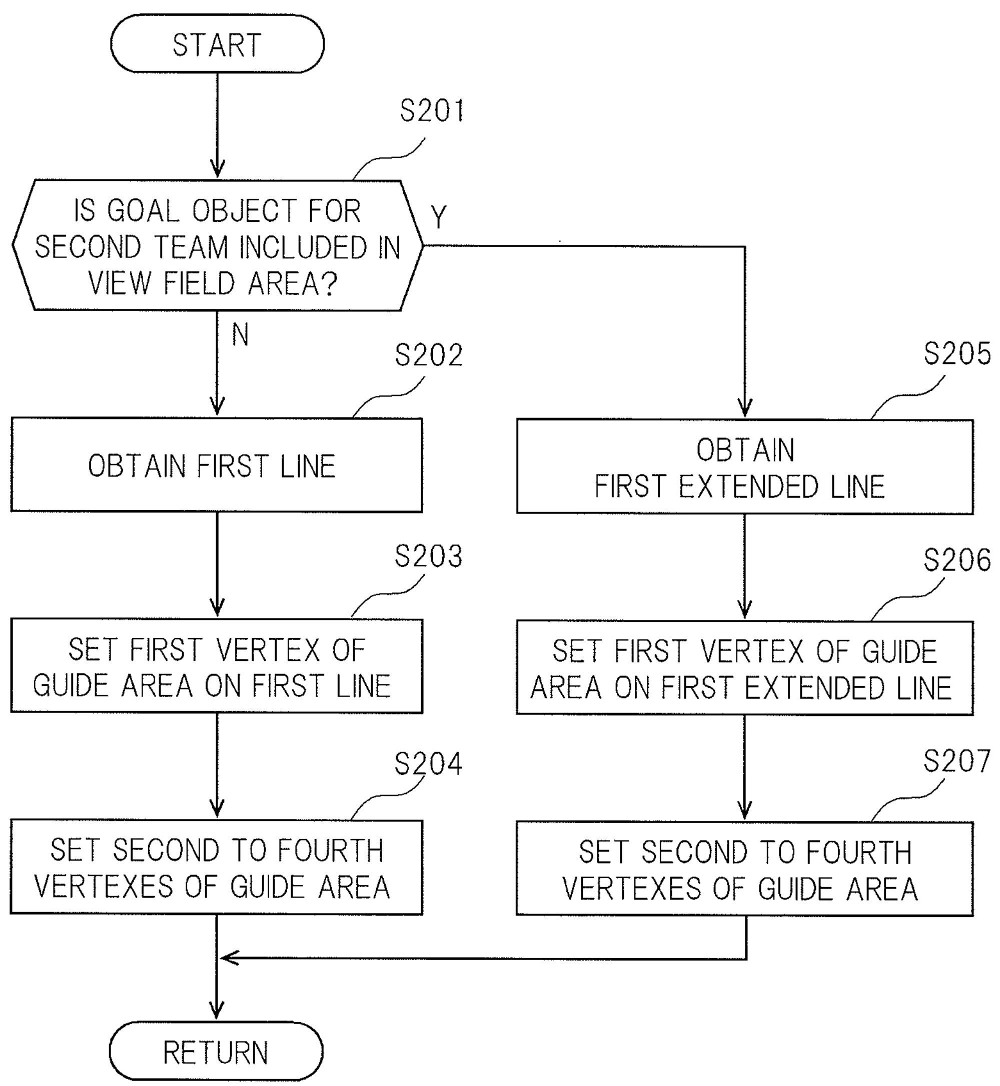
FIG. 13 is a diagram showing one example of a process to be carried out in the game device according to an embodiment of the present invention.

In the fourth modified example, after S204 and S207 in FIG. 13, the microprocessor 14 carries out the process shown in FIG. 16 before proceeding to S104.

Specifically, the microprocessor 14 initially specifies a second player object 52 which restricts the ball object 51 from moving into the area in the goal object 58 correlated to the second team (S401). For example, the microprocessor 14 specifies a second player object 52 in the triangle $QO_1O_2$. The second player object 52 specified at S401 is hereinafter referred to as a focused second player object.

Then, the microprocessor 14 determines the position T of the second guide object 82 (S402). Note that the microprocessor 14 determines the position T of the second guide object 82 such that the positional relationship between the second guide image 80 and the guide image 66 becomes identical to that between the focused second player object and the goal object 58.

For example, the microprocessor 14 determines the position T of the second guide object 82, based on the half line L4. For example, the microprocessor 14 determines a position on the half line L4 as the position T.

The microprocessor 14 determines the position T of the second guide object 82 such that the second guide image 80 is displayed being correlated to the guide image 66. For example, the position T of the second guide object 82 is set on the edge line of the guide area 67. That is, a point where the half line L4 intersects the straight line AD is determined as the position T. Alternatively, the position T of the second guide object 82 may be defined, e.g., in the guide area 67 or in an area within a predetermined distance from the guide area 67.

Note that the position T of the second guide object 82 can be specified without using the half line L4. For example, in a case where a point where the straight line passing through the position S and being parallel to the straight line $O_1O_2$ intersects the half line L1 is determined as a position X, the triangle QSX is analogous to the triangle QTA. Therefore, by utilizing the fact that the ratio between the length of the straight line QX and the length of the straight line QA is identical to the ratio between the length of the straight line SX and the length of the straight line AT, the length of the straight line AT can be obtained. This makes it possible to specify the position T of the second guide object 82, based on the position of the vertex A.

With the position T of the second guide object 82 determined at S402, the microprocessor 14 places the second guide object 82 in the position T at S104 in FIG. 12 and then produces a game screen image.

7-5. Fifth Modified Example

For example, the microprocessor 14 (movement control means) may control the angle (hereinafter referred to as an initial movement angle) formed between the XW-ZW plane (predetermined plane) and the initial moving speed vector indicating the moving direction and the moving speed when the ball object 51 kicked by the operating object starts moving, based on the distance between the reference position Q and the position designated by a game player on the XW-ZW plane. However, when controlling the initial movement angle based on the distance between the reference position Q and the position designated by a game player on the XW-ZW plane, the problem below may be caused. In order to address the above, the microprocessor 14 (guide image display control means) changes the area where the guide image 66 is displayed, based on the distance between the reference position Q and the goal object 58.

In the following, a problem caused when controlling the initial movement angle based on the distance between the reference position Q and the position designated by a game player on the XW-ZW plane will be described. Note that the position designated by a game player on the XW-ZW plane will be hereinafter referred to as a designated position by a game player.

Figures 18, 19:
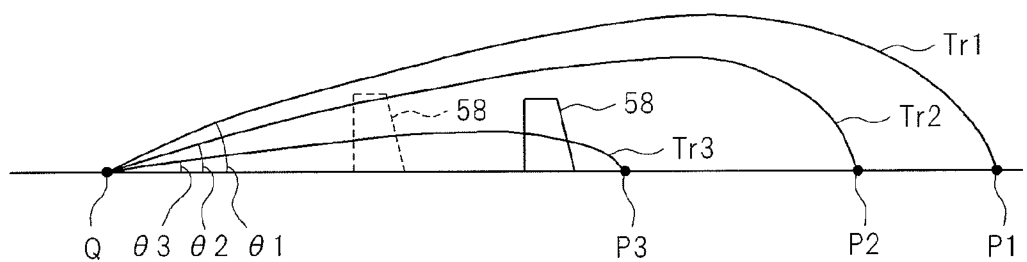
FIG. 18 is a diagram showing a relationship between a position designated by a game player and a trajectory of the ball object.
FIG. 19 is a diagram showing one example of a table read from an optical disk.

FIG. 18 is a diagram showing a relationship between a position designated by a game player and the trajectory of the ball object 51 caused, when controlling the initial movement angle, based on the distance between the reference position Q and a position designated by a game player. FIG. 18 shows a relationship between a position designated by a game player and the trajectory of the ball object 51 when the initial moving speed vector is determined such that a longer distance between the position designated by a game player and the reference position Q results in a larger initial movement angle. The trajectory Tr1 refers to the trajectory of the ball object 51 with the position P1 being designated by a game player. The trajectory Tr2 refers to the trajectory of the ball object 51 with the position P2 being designated by a game player, and the trajectory Tr3 refers to the trajectory of the ball object 51 with the position P3 being designated by a game player. The angle θ1 refers to the initial movement angle of the trajectory Tr1, the angle θ2 refers to the initial movement angle of the trajectory Tr2, and the angle θ3 refers to the initial movement angle of the trajectory Tr3. As shown in the diagram, the farther a position designated by a game player is away from the reference position Q, the larger the resulting initial movement angle.

As seen from the trajectories Tr1, Tr2, for the distance being long between the reference position Q and a position designated by a game player, the initial movement angle is so large that the ball object 51 goes over the goal object 58.

Therefore, in controlling the initial movement angle based on the distance between the reference position Q and a position designated by a game player, a problem may be caused, when the position P1, P2 is designated by a game player, where the ball object 51 will not move into the area in the goal object 58.

To address the above, in the fifth modified example, the area where the guide image 66 is displayed is changed based on the distance between the reference position Q and the goal object 58 so that the position P1, P2 is not designated. Specifically, the process described below will be carried out in the fifth modified example.

That is, in the fifth modified example, when a first player object 50 holds the ball object 51 (Y at S102 in FIG. 12), the microprocessor 14 skips 5201 in FIG. 13 and proceeds to S205. At S205 to S207, the microprocessor 14 displays the guide image 66 such that the distance between the straight line AB, which is a part of the first extended line e1, and the reference position Q and the distance between the straight line CD, which is a part of the first extended line e2, and the reference position Q are changed, based on the distance between the reference position Q and the goal object 58, in order to change the area where the guide image 66 is displayed, based on the distance between the reference position Q and the goal object 58.

More specifically, a table correlating a distance condition concerning the distance between the reference position Q and the first reference position $O_1$ and base information for determining the position of the vertex A of the guide area 67 is read from the optical disk 25. FIG. 19 shows one example of the table. As shown in FIG. 19, the table records a distance condition concerning the distance r between the reference position Q and the first reference position $O_1$ and the value of the distance W4 between the reference position Q and the vertex A in the XW axial direction, shown in FIG. 9, so as to be correlated to each other. The table shown in FIG. 19 is defined such that a longer distance r results in a smaller value of the distance W4.

After the above, the microprocessor 14 (guide image display control means) carries out the process below at S206 in FIG. 13. That is, the microprocessor 14 calculates the distance r between the reference position Q and the first reference position $O_1$, and reads from the table a value of the distance W4 correlated to a distance condition satisfied by the distance r. Further, the microprocessor 14 sets the vertex A of the guide area 67 on the first extended line e1, based on the value of the distance W4 read from the table. In this case, the distance between the vertex A, which is the representative point of the straight line AB, and the reference position Q is controlled, based on the distance r between the reference position Q and the first reference position $O_1$, such that the distance between the straight line AB and the reference position Q will change based on the distance r between the reference position Q and the first reference position $O_1$. In addition, the distance between the vertex D, which is the representative point of the straight line CD, and the reference position Q is controlled, based on the distance r between the reference position Q and the first reference position $O_1$, such that the distance between the straight line CD and the reference position Q will change, based on the distance r between the reference position Q and the first reference position $O_1$. Note that the representative point of the straight line AB may be any point on the straight line AB other than the vertex A, and the representative point of the straight line CD may be any point on the straight line CD other than the vertex D.

In the fifth modified example, because the guide area 67 is set as described above, a longer distance (distance r between the reference position Q and the first reference position $O_1$) between the ball object 51 and the goal object 58 results in a shorter distance (that is, the distance W4 between the reference position Q and the vertex A in the XW axial direction) between the ball object 51 and the guide area 67. Therefore, in the fifth modified example, the position of the guide area 67 is controlled so that the ball object 51 when being kicked by the operating object will not go over the cross-bar. For example, when the operating object (or the ball object 51) is positioned relatively far from the goal object 58 (e.g., the goal object 58 indicated by the solid line in FIG. 18), the guide area 67 is not set in a position (e.g., near the position P1 or P2 in FIG. 18) relatively far from the goal object 58, but in a position (e.g., near the position P3 in FIG. 18) relatively close to the goal object 58. Therefore, according to the fifth modified example, it is possible to arrange such that a game player can readily move the ball object 51 into the area in the goal object 58 even when the initial movement angle at the moment when the ball object 51 starts moving is controlled based on the distance between the ball object 51 and a position designated by a game player.

Note that it may be arranged, in order to change the area where the guide image 66 is displayed, based on the distance between the reference position Q and the goal object 58, such that only one of the distance between the straight line AB and the reference position Q and the distance between the straight line CD and the reference position Q will change based on the distance between the reference position Q and the goal object 58. Alternatively, it may be arranged such that at least one of the distance between the straight line AB and the first reference position $O_1$ and the distance between the straight line CD and the second reference position $O_2$ may be changed based on the distance between the reference position Q and the goal object 58. Note that the distance between the straight line AB and the first reference position $O_1$ refers to the distance between the representative point of the straight line AB and the first reference position $O_1$, and the distance between the straight line CD and the second reference position $O_2$ refers to the distance between the representative point of the straight line CD and the second reference position $O_2$.

7-6. Sixth Modified Example

For example, in order to make it likely to achieve a successful pass to a first player object 50 not shown in a game screen image, the guide image 66 may be shown in a game screen image. In the following, a sixth modified example will be described with reference to FIGS. 20 and 21. Note that a first player object 50 not shown in a game screen image will be hereinafter referred to as a player object outside a screen image.

In the sixth modified example, when the ball object 51 is held by a first player object 50, the microprocessor 14 specifies a first player object 50 (that is, a player object outside a screen image) other than the operating object and not shown in a game screen image. Then, the microprocessor 14 sets a guide area 67 for every player object outside a screen image.

Figure 20:
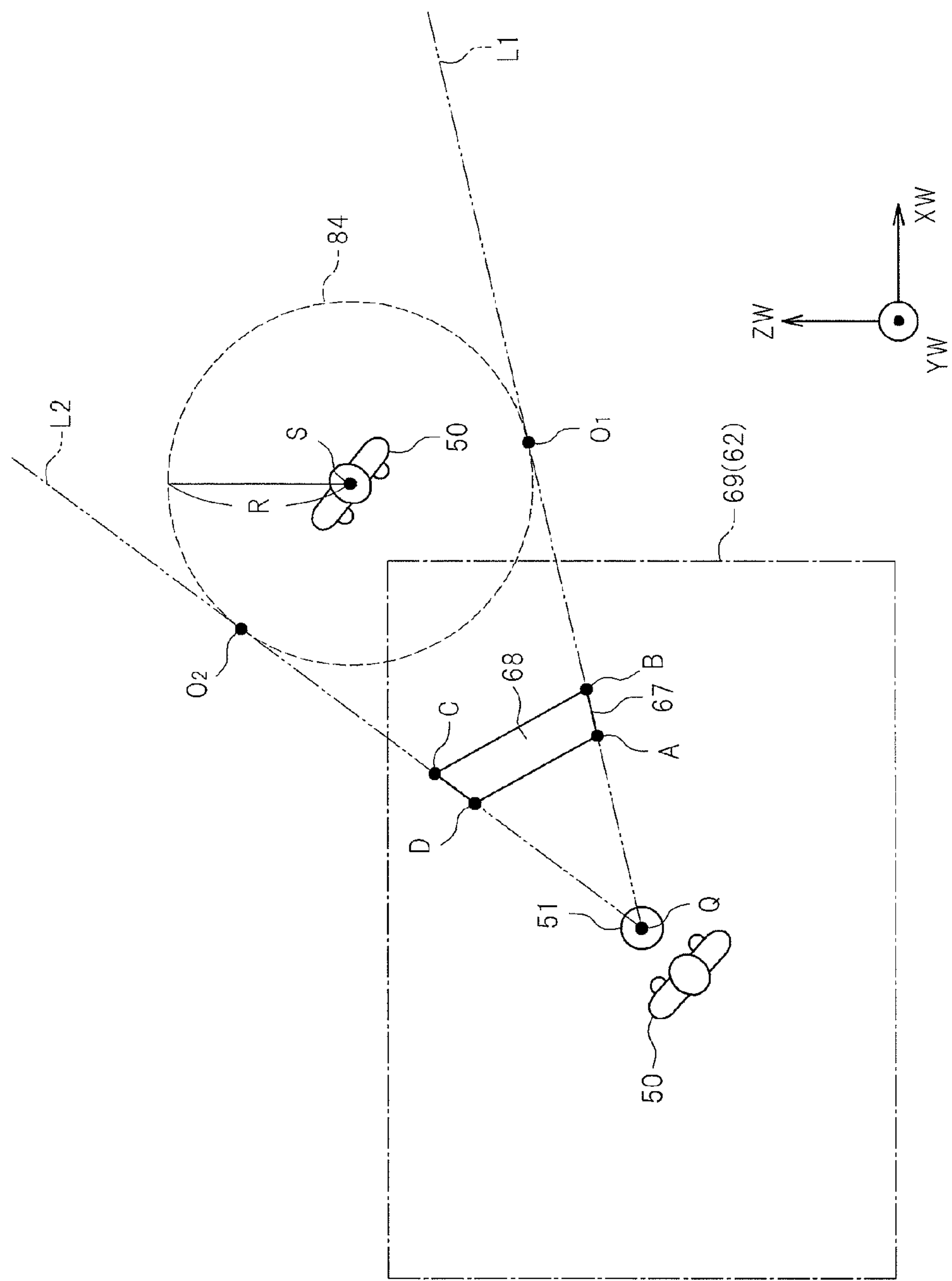
FIG. 20 is a diagram showing one example of a condition of the game space.

FIG. 20 is a diagram showing one example of a condition of the game space with the guide area 67 set. The first player object 50 shown on the left side is the operating object, and the first player object 50 shown on the right side is a player object outside a screen image. The position S refers to the position of the player object outside a screen image on the XW-ZW plane, and the determination area 84 (predetermined area) is an area within a predetermined distance r from the position S. When the ball object 51 having been kicked by the operating object moves into the determination area 84, the ball object 51 is held by the player object outside a screen image. That is, a successful pass event (game event) in which the ball object 51 is successfully passed from a first player object 50 (operating object) to another first player object (player object outside a screen image) occurs.

As shown in the diagram, in the sixth modified example, two tangent lines starting from the reference position Q and in contact with the determination area 84 are set as a half line L1 and a half line L2. In addition, a contact point between the half line L1 and the determination area 84 is set as a first reference position $O_1$, and a contact point between the half line L2 and the determination area 84 is set as a second reference position $O_2$. Therefore, in the sixth modified example, the first reference position $O_1$ and the second reference position $O_2$ are not fixed but will change depending on the positional relationship between the reference position Q and the determination area 84. Note that the half line L1, the half line L2, the first reference position $O_1$, and the second reference position $O_2$ are calculated in a predetermined operation.

Figure 21:
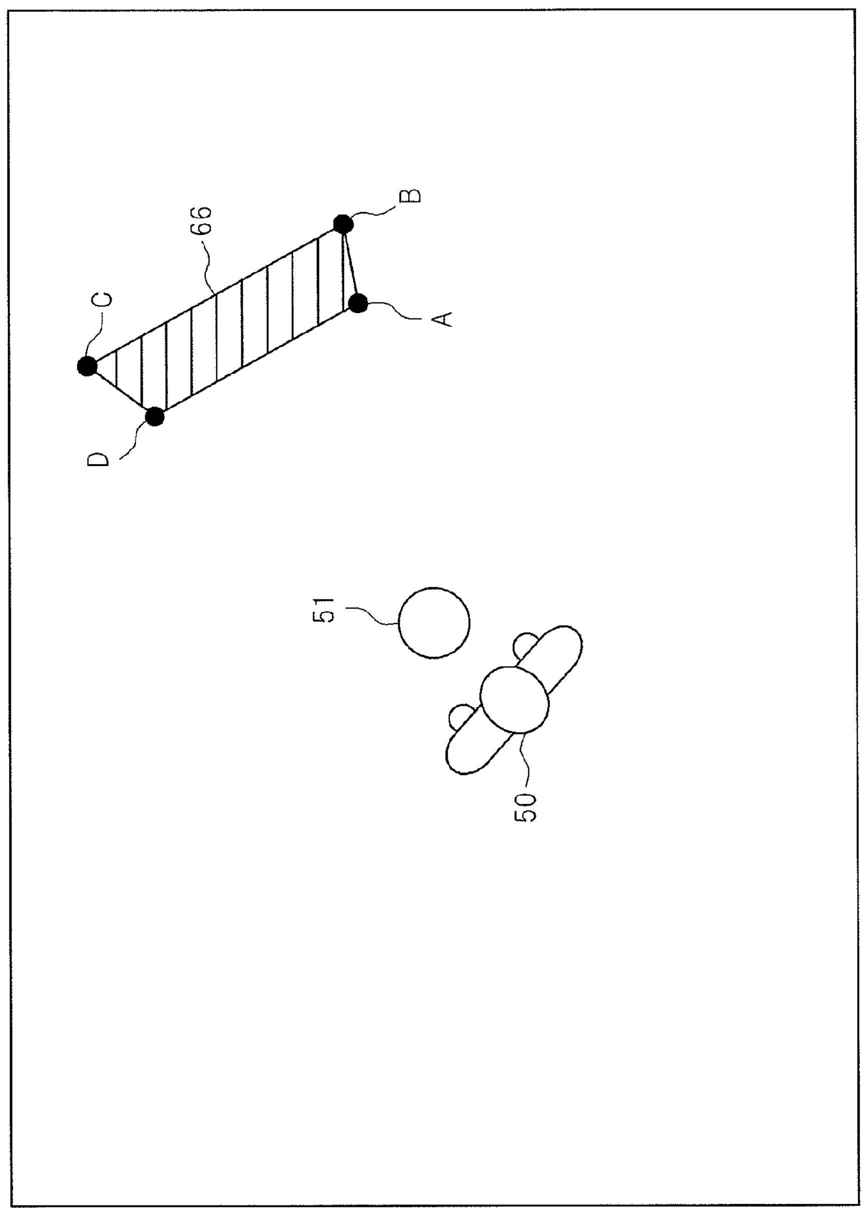
FIG. 21 is a diagram showing one example of a game screen image.

As shown in the diagram, the vertexes A and B of the guide area 67 are set on the straight line $QO_1$, while the vertexes C and D of the guide area 67 are set on the straight line $QO_2$. As shown in the diagram, the guide object 68 is placed in the guide area 67. As a result, the game screen image shown in FIG. 21 is displayed.

Note that the half line L1 and the half line L2 are not necessarily a tangent line of the determination area 84. For example, supposing that a half line starting from the reference position Q is rotated clockwise with the reference position Q at the center by every predetermined angle, the half line at the moment when having being just changed from "the state of contacting the determination area 84" (hereinafter referred to as a first state) to "the state of not contacting the determination area 84" (hereinafter referred to as a second state) may be defined as a half line L1, and that when having been just changed from the second state to the first state may be defined as a half line L2. In this case, a point, for example, where a normal from the position S to the half line L1 intersects the half line L1 is defined as a first reference position $O_1$, and a point where a normal from the position S to the half line L2 intersects the half line L2 is defined as a second reference position $O_2$.

According to the sixth modified example, a game player can readily designate a position in a game screen image, which allows the ball object 51 to move into the determination area 84.

8. OTHERS

For example, although the microprocessor 14 displays the guide image 66 in a game screen image by placing the guide object 68 in the guide area 67 in the above-described embodiment (S104 in FIG. 12), the guide image 66 may be shown in a game screen image by rendering the guide image 66 over an area corresponding to the guide area 67 in the VRAM.

For example, the guide area 67 may be set in front of or behind the goal object 58. For example, when the goal object 58 correlated to the second team is included in the view field area 62 (Y at S201 in FIG. 12), the microprocessor 14 may carry out the process at S202 to S204 in addition to the process at S205 to S207. As a result, the guide image 66 is shown in front of or behind the image of the goal object 58.

For example, the vertexes A to D are not necessarily defined such that the straight line AD and the straight line BC extend parallel to the goal line 57_a_ (i.e., the straight line $O_1O_2$).

For example, the microprocessor 14 may show the image of the straight line AB and the image of the straight line CD in a game screen image. In this case, a combination of the image of the straight line AB and the image of the straight line CD constitutes a guide image.

For example, the microprocessor 14 may show the image of either one of the vertexes A and B of the guide area 67 and the image of either one of the vertexes C and D of the guide area 67 in a game screen image. In this case, a combination of these images corresponds to a guide image. For example, the microprocessor 14 may show the image of a line connecting either one of the vertexes A and B of the guide area 67 and either one of the vertexes C and D of the guide area 67 as a guide image in a game screen image.

For example, it may be arranged such that a game player can designate a moving direction of the ball object 51, using the direction button 44. In this case, the microprocessor 14 moves the ball object 51 in a direction based on the direction designated by a game player using the direction button 44. For example, the microprocessor 14 may determine the direction of the initial moving speed vector of the ball object 51, based on the direction designated by a game player using the direction button 44 when the kick instruction button is pressed. In this case as well, with the guide image 66 being displayed, the operability for a game player in designating a direction so that the ball object 51 moves toward the goal object 58 can be improved.

For example, it may be arranged such that a game player can designate the initial movement angle of the ball object 51 by changing the position of the controller 32. In this case, a game player presses the kick instruction button, while moving the controller 32 (e.g., while putting out the controller 32 toward the display device 18). In this case, the microprocessor 14 specifies the amount of change in position of the controller 32 (e.g., a moving distance of the controller 32), based on an operation signal received by the controller interface 30, and determines the initial movement angle, based on the position change amount.

The present invention is applicable to other games. For example, the present invention can be applied to a sport game (e.g., baseball game, basket ball game, rugby game, American football game, hand ball game, water polo game, field hockey game, ice hockey game, curling game, and so forth) other than a soccer game. For an ice hockey game, a puck corresponds to the moving object. For a curling game, a stone corresponds to the moving object, and the house corresponds to a predetermined area. For example, the present invention is applicable to a game (e.g., a shooting game) other than a sport game.

The invention claimed is:

1. A game device for carrying out a game in which a moving object moves in a game space, based on an operation by a game player, the game device comprising:

a game screen image display control unit that shows at least a partial area of the game space in a game screen image;

a movement control unit that moves the moving object in a direction based on a direction designated by the game player or a direction based on a position designated by the game player; and a guide image display control unit that shows a guide image in the game screen image, the guide image for indicating a first area between at least a part of a first line, extending from a reference position related to the moving object to a first position related to a predetermined area in the game space, and at least a part of a second line extending from the reference position to a second position related to the predetermined area, or a second area between at least a part of a first extended line, which is an extended line of the first line, and at least a part of a second extended line, which is an extended line of the second line.

2. The game device according to claim 1, wherein the game screen image display control unit shows the partial area of the game space in the game screen image, and the guide image display control unit, when the entirety or a part of the predetermined area is not shown in the game screen image, shows the guide image for indicating the first area in the game screen image.

3. The game device according to claim 1, wherein the game is a game in which a plurality of game characters move in the game space, the moving object is correlated to any of the plurality of game characters, the reference position is a position of the moving object or a position of a game character correlated to the moving object, and the guide image display control unit shows the guide image for indicating the first area between a part of the first line and a part of the second line such that at least one of a distance between the part of the first line and the reference position or the first position, and a distance between the part of the second line and the reference position or the second position, is changed, based on a parameter correlated to a game character correlated to the moving object among parameters stored in at least one storage that stores parameters so as to be correlated to respective game characters.

4. The game device according to claim 1, wherein the game is a game in which a plurality of game characters move in the game space, the moving object is correlated to any of the plurality of game characters, the reference position is a position of the moving object or a position of a game character correlated to the moving object, and the guide image display control unit shows the guide image for indicating the second area between a part of the first extended line and a part of the second extended line such that at least one of a distance between the part of the first extended line and the reference position or the first position, and a distance between the part of the second extended line and the reference position or the second position, is changed, based on a parameter correlated to a game character correlated to the moving objet among parameters stored in at least one storage that stores parameters so as to be correlated to respective game characters.

5. The game device according to claim 1, wherein the game is a game in which a plurality of game characters move in the game space, the moving object is correlated to any game character of the plurality of game characters, the reference position is a position of the moving object or a position of a game character correlated to the moving object, and the game device further comprises a limit unit that limits display of the guide image, based on a relationship between orientation of a game character correlated to the moving object and a direction from the reference position to the predetermined area.

6. The game device according to claim 1, wherein the guide image display control unit shows an image corresponding to a game character or an object which restricts movement of the moving object, so as to be correlated to the guide image in the game screen image, and controls a display position of the image corresponding to the game character or the object such that a positional relationship between the image corresponding to the game character or the object and the guide image becomes identical to a positional relationship between the game character or the object and the predetermined area.

7. The game device according to claim 1, wherein the game is a sport game carried out between a first team corresponding to the game player and a second team, with a score event occurring for the first team when the moving object moves into the predetermined area, the reference position, when the moving object is correlated to any of a plurality of game characters belonging to the first team, is a position of the moving object or a position of a game character correlated to the moving object, and the movement control unit causes, when the moving object is correlated to a game character belonging to the first team and a position designated by the game player is included in an area where the guide image is shown, the game character correlated to the moving object to carry out a shoot action, and carries out, when the moving object is correlated to a game character belonging to the first team and a position designated by the game player is included in an area where the guide image is shown, movement control corresponding to the shoot action with respect to the moving object.

8. The game device according to claim 1, wherein the game space is a three dimensional space, the movement control unit controls an angle formed by a moving direction when the moving object starts moving and a predetermined plane, based on a distance between the reference position and a position designated by the game player, and the guide image display control unit shows the guide image for indicating the second area between a part of the first extended line and a part of the second extended line such that at least one of a distance between the part of the first extended line and the reference position or the first position, and a distance between the part of the second extended line and the reference position or the second position, is changed, based on a distance between the reference position and the predetermined area.

9. A control method for controlling a game device that includes at least one processor, the game device for carrying out a game in which a moving object moves in a game space, based on an operation by a game player, the control method comprising:

showing, using the at least one processor, at least a partial area of the game space in a game screen image;

moving, using the at least one processor, the moving object in a direction based on a direction designated by the game player or a direction based on a position designated by the game player; and showing, using the at least one processor, a guide image in the game screen image, the guide image for indicating a first area between at least a part of a first line, extending from a reference position related to the moving object to a first position related to a predetermined area in the game space, and at least a part of a second line extending from the reference position to a second position related to the predetermined area, or a second area between at least a part of a first extended line which is an extended line of the first line and at least a part of a second extended line which is an extended line of the second line.

10. A non-transitory computer readable information storage medium storing a program for causing a computer to function as a game device for carrying out a game in which a moving object moves in a game space, based on an operation by a game player, the program for causing the computer to function as:

a game screen image display controller that shows at least a partial area of the game space in a game screen image;

a movement controller that moves the moving object in a direction based on a direction designated by the game player or a direction based on a position designated by the game player; and a guide image display controller that shows a guide image in the game screen image, the guide image for indicating a first area between at least a part of a first line, extending from a reference position related to the moving object to a first position related to a predetermined area in the game space, and at least a part of a second line extending from the reference position to a second position related to the predetermined area, or a second area between at least a part of a first extended line which is an extended line of the first line and at least a part of a second extended line which is an extended line of the second line.

11. A game device for carrying out a game in which a moving object moves in a game space, the game device comprising:

at least one memory; and at least one processor configured to control a display to display at least a partial area of the game space in a game screen image; control a moving object to move in a direction based on a direction designated by the game player or a direction based on a position designated by the game player; and control a display to display a guide image in the game screen image, the guide image indicating a first area between at least a part of a first line, extending from a reference position related to the moving object to a first position related to a predetermined area in the game space, and at least a part of a second line extending from the reference position to a second position related to the predetermined area, or a second area between at least a part of a first extended line, which is an extended line of the first line, and at least a part of a second extended line, which is an extended line of the second line.

12. A control method for controlling a game device that includes at least one processor, the game device for carrying out a game in which a moving object moves in a game space, the control method comprising:

controlling a display to display at least a partial area of the game space in a game screen image;

controlling a moving object to move in a direction based on a direction designated by the game player or a direction based on a position designated by the game player; and controlling a display to display a guide image in the game screen image, the guide image indicating a first area between at least a part of a first line, extending from a reference position related to the moving object to a first position related to a predetermined area in the game space, and at least a part of a second line extending from the reference position to a second position related to the predetermined area, or a second area between at least a part of a first extended line, which is an extended line of the first line, and at least a part of a second extended line, which is an extended line of the second line.

13. A non-transitory computer readable information storage medium storing a program for causing a computer to function as a game device for carrying out a game in which a moving object moves in a game space, the program for causing the computer to function as:

a controller that controls a display to display at least a partial area of the game space in a game screen image; controls a moving object to move in a direction based on a direction designated by the game player or a direction based on a position designated by the game player; and controls a display to display a guide image in the game screen image, the guide image indicating a first area between at least a part of a first line, extending from a reference position related to the moving object to a first position related to a predetermined area in the game space, and at least a part of a second line extending from the reference position to a second position related to the predetermined area, or a second area between at least a part of a first extended line, which is an extended line of the first line, and at least a part of a second extended line, which is an extended line of the second line.

* * * * *